United States Patent [19]
Yamasaki et al.

[11] Patent Number: 5,490,058
[45] Date of Patent: Feb. 6, 1996

[54] MODULATING CONTROLLER FOR CONTROLLING TWO OPERATION TERMINALS

[75] Inventors: Masuo Yamasaki; Shinichi Teramura; Koji Kurano, all of Tokyo, Japan

[73] Assignee: Kabushiki Kaisha Toshiba, Kawasaki, Japan

[21] Appl. No.: 22,464

[22] Filed: Feb. 25, 1993

[30] Foreign Application Priority Data

Feb. 28, 1992 [JP] Japan .................................. 4-075737
Nov. 30, 1992 [JP] Japan .................................. 4-341059

[51] Int. Cl.$^6$ ................................................. G05B 13/00
[52] U.S. Cl. .................... 364/160; 364/180; 364/181
[58] Field of Search ..................... 364/158, 159, 364/160–166, 176–182, 137, 148, 152; 318/590, 591, 592, 593, 594

[56] References Cited

U.S. PATENT DOCUMENTS

| | | | |
|---|---|---|---|
| 3,940,594 | 2/1976 | Bleak et al. | 364/161 X |
| 4,141,065 | 2/1979 | Sumi et al. | 364/181 |
| 4,143,415 | 3/1979 | Klingbeil | 364/182 X |
| 4,469,994 | 9/1984 | Lundberg et al. | 364/181 |
| 4,500,950 | 2/1985 | Putman | 364/176 |
| 4,551,795 | 11/1985 | Fisher et al. | 364/172 X |
| 4,682,279 | 7/1987 | Watabe | 364/180 X |
| 4,901,625 | 2/1990 | Bussan et al. | 364/182 X |
| 5,191,521 | 3/1993 | Brosjlow | 364/172 X |
| 5,195,027 | 3/1993 | Breckner | 364/182 X |

Primary Examiner—Roy N. Envall, Jr.
Assistant Examiner—Brian C. Oakes
Attorney, Agent, or Firm—Oblon, Spivak, McClelland, Maier, & Neustadt

[57] ABSTRACT

This invention relates to a modulating controller for controlling two operation terminals, and more particularly to a device to suppress disturbance to a process when a control signal is switched or when a bias is set. This invention, in a modulating controller to control a process amount by the total of two operation terminals disposed in parallel, when either of two H/A station devices outputs a manual operation value, provides a device which outputs a value obtained by reducing the manual operation value from the control amount of the process amount to be controlled by the total of two operation terminals as the control operation signal to the other H/A station device and prepares a value almost same with the operation terminal control signal outputted by one H/A station device as the control operation signal for one H/A station device. And, this invention automatically controls the process amount by either of the two operation terminals disposed in parallel, and in the modulating controller making one side as the backup, one operation terminal control signal is always tracked to the control operation device when both operation terminals are manually operated. When switching the other operation terminal to the automatic operation, timing to switch the other operation terminal to the automatic operation and timing to release tracking are delayed. During which a device to switch the tracking signal to the output of the other operation terminal is disposed.

10 Claims, 15 Drawing Sheets

Fig.20A
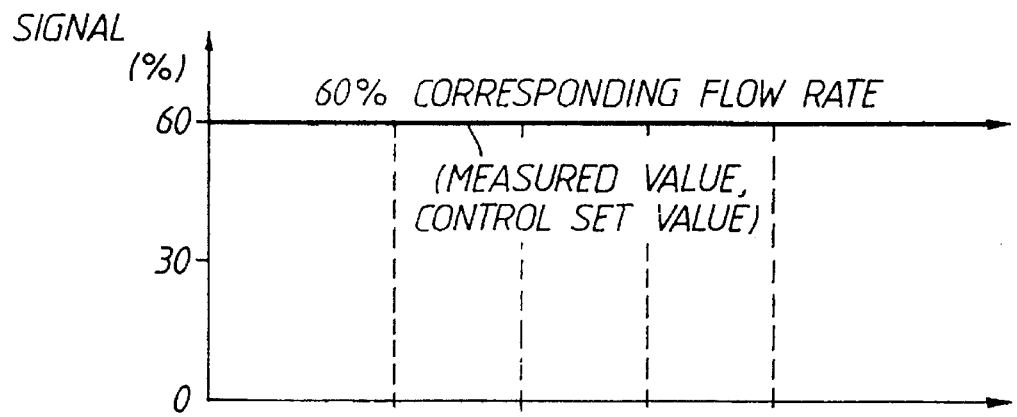
Fig.20B
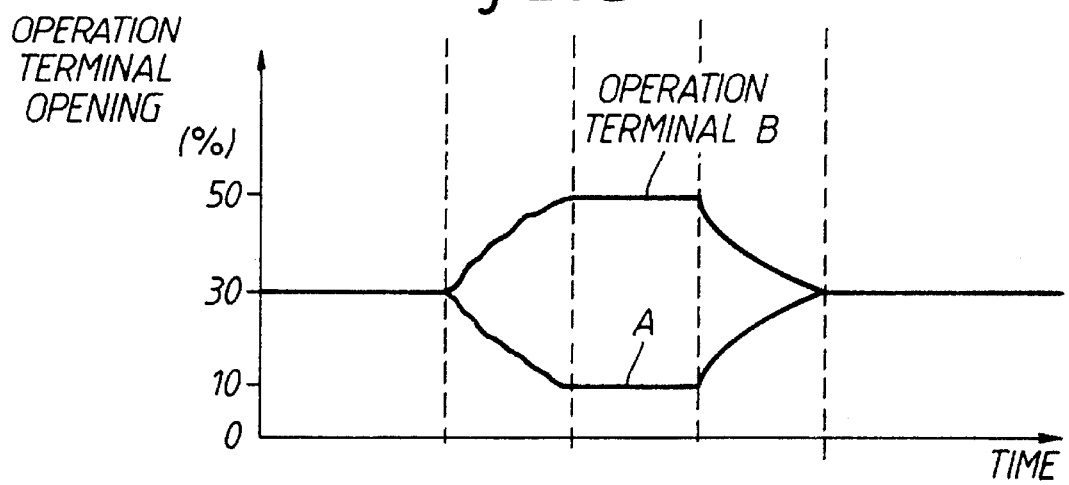
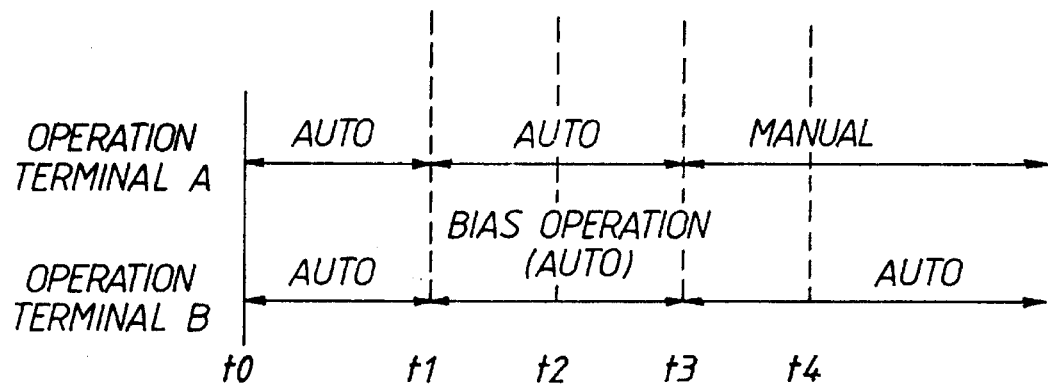
Fig.20C

MODULATING CONTROLLER FOR CONTROLLING TWO OPERATION TERMINALS

BACKGROUND OF THE INVENTION

This invention relates to a modulating controller for controlling two operation terminals, and more particularly to a device to suppress disturbance to a process when a control signal is switched or when a bias is set.

FIG. 1 shows a conventional modulating controller, and this modulating controller controls operation terminals each disposed in a branched channel. The operation terminal is a flow control valve for example.

Liquid flows in this channel in the directions from A to B. This channel is parted into branch lines 2A, 2B on its way. The branch lines 2A, 2B are provided with operation terminals 3A, 3B respectively. In the joined channel, orifice 4 is provided. Differential pressure before and after the orifice is detected by sensor 5. This detected signal is subjected to the calculation of extraction of the square root, and inputted into modulating controller 1 as a measured value of this flow rate. The modulating controller 1 conducts a control-operation so that the operation terminals 3A, 3B share a half of the flow rate needed, and the operation terminal 3A control signal and the operation terminal 3B control signal are outputted to the corresponding operation terminals 3A, 3B to control the flow rate of the channel at a certain value.

FIG. 2 shows a construction of a specific modulating controller 1. The modulating controller 1 comprises setting signal generator means 6, difference operation means 7, PID operation means 8, and two H/A station 9A, 9B.

The difference operation means 7 operates a difference signal between the detection signal of the sensor 5 and the set signal of the setting signal generator means 6. This difference signal is entered into the PID operation means 8. The PID operation means 8 conducts operation treatments of proportion, integral and differential based on this difference signal, and outputs PID control signal. This PID control signal becomes the operation terminal 3A control signal and the operation terminal 3B control signal via two H/A station 9A, 9B. According to the operation terminal 3A control signal and the operation terminal 3B control signal, the corresponding operation terminals 3A, 3B are controlled.

When the operation terminals 3A, 3B are manually operated, a manual section provided on the H/A station 9A, 9B is operated. When an automatic operation signal is inputted into the H/A station 9A, 9B, the operation terminals 3A, 3B are controlled to be opened or closed by the PID control signal. Thus, the H/A station 9A, 9B have functions to switch to a signal by manual operation or PID control signal. Therefore, the operation terminals 3A, 3B can operate separately by manual operation other than PID control signal.

When a half of the flow rate needed is shared to control by the operation terminals 3A, 3B, as a rule, the operation terminals 3A, 3B use the same equipment. Even if the same equipment is used, characteristics may vary slightly depending on each equipment. In such a case, in order to compensate for the characteristics of the equipment, a bias setting is made to one of the operation terminal control signals.

FIG. 3 is an example of a control block diagram having bias setting means 10.

The system on the operation terminal 3B side has a bias function. The bias setting means 10 has a plus or minus bias setting signal set. Addition means 11 adds the bias setting signal to the PID control signal and outputs.

For example, in the plant structure shown in FIG. 1, at either of the operation terminals 3A, 3B, the needed flow rate is flown, and the other operation terminal is determined to be a backup. In such a structure, the valve of each operation terminal to be used is a valve which can flow the base flow or more. In this structure, one operation terminal only is automatically operated and the other operation terminal is manually operated.

When the operation terminal to make automatic operation is switched to the other operation terminal, one operation terminal is once changed to manual operation, then the other operation terminal is switched to automatic operation. Therefore, there is a period that both of them are in manual operation. In order to make it bumpless when the PID control is switched from manual operation to automatic operation, it is necessary to always tracking the current output of the operation terminal which becomes automatic operation next time to the integral element of the PID operation means of the modulating controller 1. However, since it is impossible to assume which will be automatically operated next time, it cannot be determined which output of the operation terminals 3A, 3B is tracked.

Heretofore, as a countermeasure in such a case, the devices shown in FIG. 4, FIG. 5 and FIG. 6 were used. The device of FIG. 4 has mean value operation means 13A provided. The mean value operation means 13A operates the average of the operation terminal 3A control signal and the operation terminal 3B control signal, and outputs a tracking signal to the PID operation means 8. The device of FIG. 5 is provided with high selector means 13B. The high selector means 13B selects the high values of output of the operation terminal 3A control signal and the operation terminal 3B control signal, and outputs a tracking signal to the PID operation means 8. The device of FIG. 6 is provided with low selector means 13C. The low selector means 13C selects the low values of output of the operation terminal 3A control signal and the operation terminal 3B control signal, and outputs a tracking signal to the PID operation means 8. The devices shown in FIG. 4 and FIG. 5 have a structure to make the tracking condition generator signal an ON signal when the automatic selection signal A and the automatic selection signal B are execution halt signal (OFF signal). When this tracking condition generator signal is ON signal, the tracking signal is inputted in the PID operation means 8 and tracked to the integral element of the PID operation means 8.

However, conventional devices shown in FIG. 2 through FIG. 8 give disturbance to the process system of the plant every time the operation terminal is separated from PID control or entered under PID control, and they have a problem that the plant is put under a dangerous condition according to the magnitude of disturbance.

First, conventional modulating controller 1 shown in FIG. 2 has the operation terminal 3A control signal and the operation terminal 3B control signal equal under an ordinary condition that the H/A station 9A, 9B are under automatic operation. And, two operation terminals 3A, 3B share the flow rate into a half to control so that the flow rate becomes equal to the set signal. When either of the H/A station 9A, 9B is switched from this condition to manual operation, the control input of the manual operation to the flow rate which has been shared in half by the operation terminal 3A and the operation terminal 3B gives disturbance to the process system resulting in varying the process system.

Conversely, when either of the operation terminals is returned from the manual operation to the automatic operation, disturbance is also given to the process system. Therefore, there was required the operation by a skilled operator to switch to the automatic operation after operating so that the operation terminal under automatic operation and the operation terminal under manual operation gradually become an equal output signal gradually.

Second, conventional modulating controller 1 shown in FIG. 3, when bias setting is operated by bias setting means 10, from a state that the operation terminals 3A, 3B flow the flow rate in half to control, the bias control input content disturbs the process system. Such a conventional device had a problem to give disturbance to the process system of the plant every time the bias operation was conducted.

Third, since the conventional devices shown in FIG. 4 through FIG. 8 do not always track the opening of the operation terminal which is automatically operated next time, it cannot be said to be a perfect tracking which can correspond to any case.

That is to say, in case of the device shown in FIG. 4, the mean value of the operation terminal 3A control signal and operation terminal 3B control signal is tracked. Therefore, whichever of the operation terminal 3A control signal and operation terminal 3B control signal is switched to automatic operation, bumping is made to the mean value, and automatic operation is started from the mean value.

In case of FIG. 5, a larger one of the operation terminal 3A control signal and operation terminal 3B control signal is tracked. When the larger one of the operation terminal 3A control signal and operation terminal 3B control signal is switched to automatic operation, shift is made to automatic operation without bump. Therefore, there in no problem. When a smaller one of the operation terminal 3A control signal and operation terminal 3B control signal is switched to automatic operation, it is bumped to the larger one, then automatic operation is started.

In case of the device shown in FIG. 6, a smaller one of the operation terminal 3A control signal and operation terminal 3B control terminal is tracked. When the smaller one of the operation terminal 3A control signal and operation terminal 3B control signal is switched to automatic operation, shift is made to automatic operation without bump. Therefore, there is no problem. When the larger one of the operation terminal 3A control signal and operation terminal 3B control signal is switched to automatic operation, it is bumped to the smaller one, then automatic operation is started.

This bumping between the operation terminal 3A control signal and the operation terminal 3B control signal becomes disturbance against the plant, making the plant on a dangerous condition.

SUMMARY OF THE INVENTION

An object of this invention is to provide a modulating controller which can simply switch the operation between automatic (control operation signal, e.g. PID control signal) and other control signals (e.g. manual control signal) and reduce disturbance to the process system.

In order to complete the above object, in the modulating controller to control the process amount with the total of two operation terminals set in parallel, when one of the first and second signal switching means (e.g. H/A station or signal transfer) outputs the other control signal as the operation terminal control signal, this invention provides a preceding adjusting means which outputs the value obtained by reducing the other control signal from the control amount of the process amount to be controlled with the two operation terminals as the control to the other signal switching means, and prepares as the control operation signal a value which is almost the same with the operation terminal control signal which is outputted to this one signal switching means to the one signal switching means.

According to the invention configured like this, when one operation terminal is operated by the other control signal (e.g. manual operation signal), the control operation signal (e.g. PID control signal) is precedingly compensated by the other operation terminal control signal. Therefore, even if switched from the other control signal to the control operation signal, disturbance to the process can be suppressed to the minimum and the control system can be stabilized soon.

And, when the one operation terminal is operated by the other control signal (e.g. manual operation signal), a value obtained by reducing the other control signal value (e.g. manual operation value) from the entire control amount is sent as the control operation signal to the other operation terminal, so that the disturbance Siren to the process can be made small.

In order to accomplish the above object, this invention, in the modulating controller which automatically controls the process amount by the control operation signal in which one of the two operation terminals is disposed in parallel and backups the other, provides a means which always tracks one operation terminal control signal to the control operation means when the both operation terminals are the other control signal (e.g. manual operation signal). Therefore, switching can be made without bumping one of the operation terminals to the automatic operation. Further, when the other operation terminal is switched to the automatic operation, there is provided a means which delays the timing to switch the other operation terminal to the automatic operation and the timing to release the tracking. During which, the tracking signal is switched to the output of the other operation terminal, so that switching can be made without bumping the other operation terminal to the automatic operation.

BRIEF DESCRIPTION OF THE DRAWINGS

In the accompanying drawings;

FIG. 20 is a time chart showing an embodiment of the action of FIG. 15;

DETAILED DESCRIPTION OF THE PREFERRED EMBODIMENTS

Preferred embodiments of this invention will be described with reference to the attached drawings.

Figure 1:
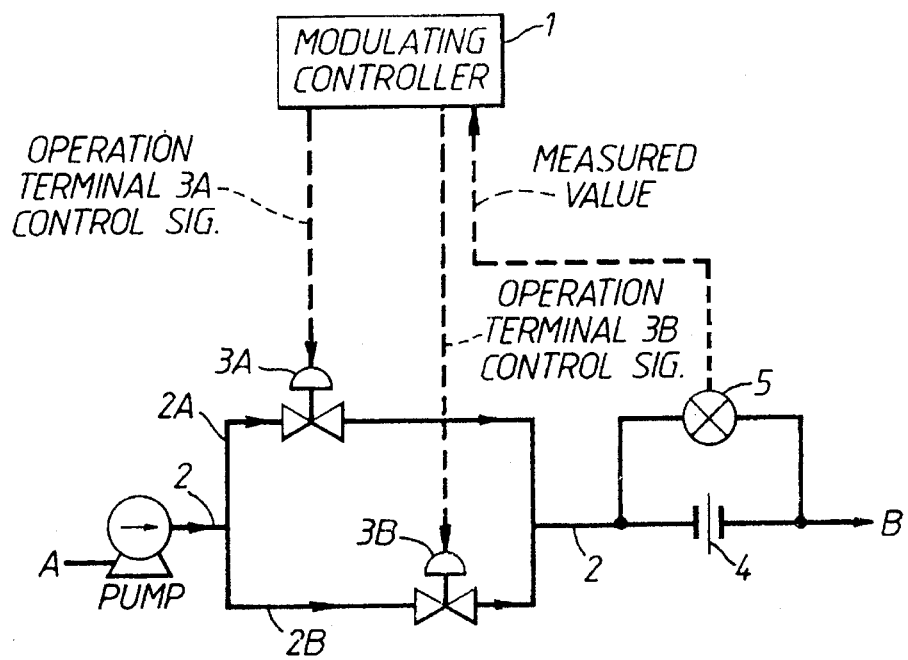
FIG. 1 is a system diagram showing the construction of a plant.
Figure 2:
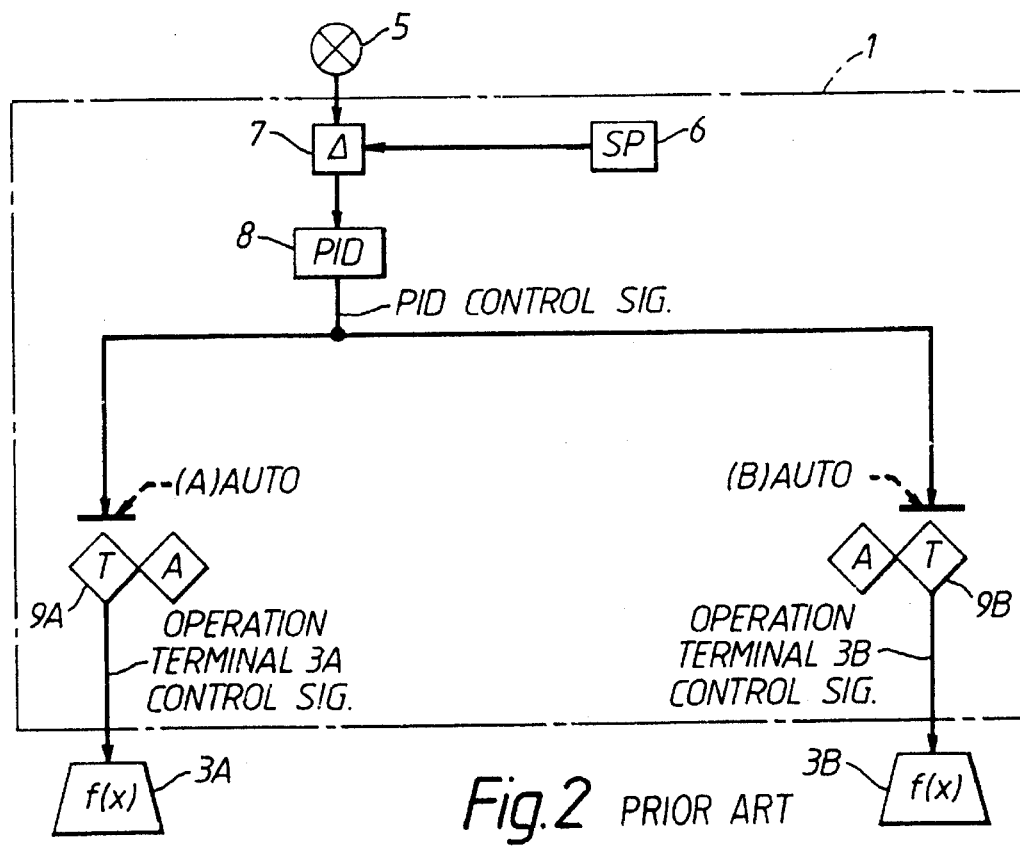
FIG. 2 is a block diagram showing a conventional modulating control let.
Figure 7:
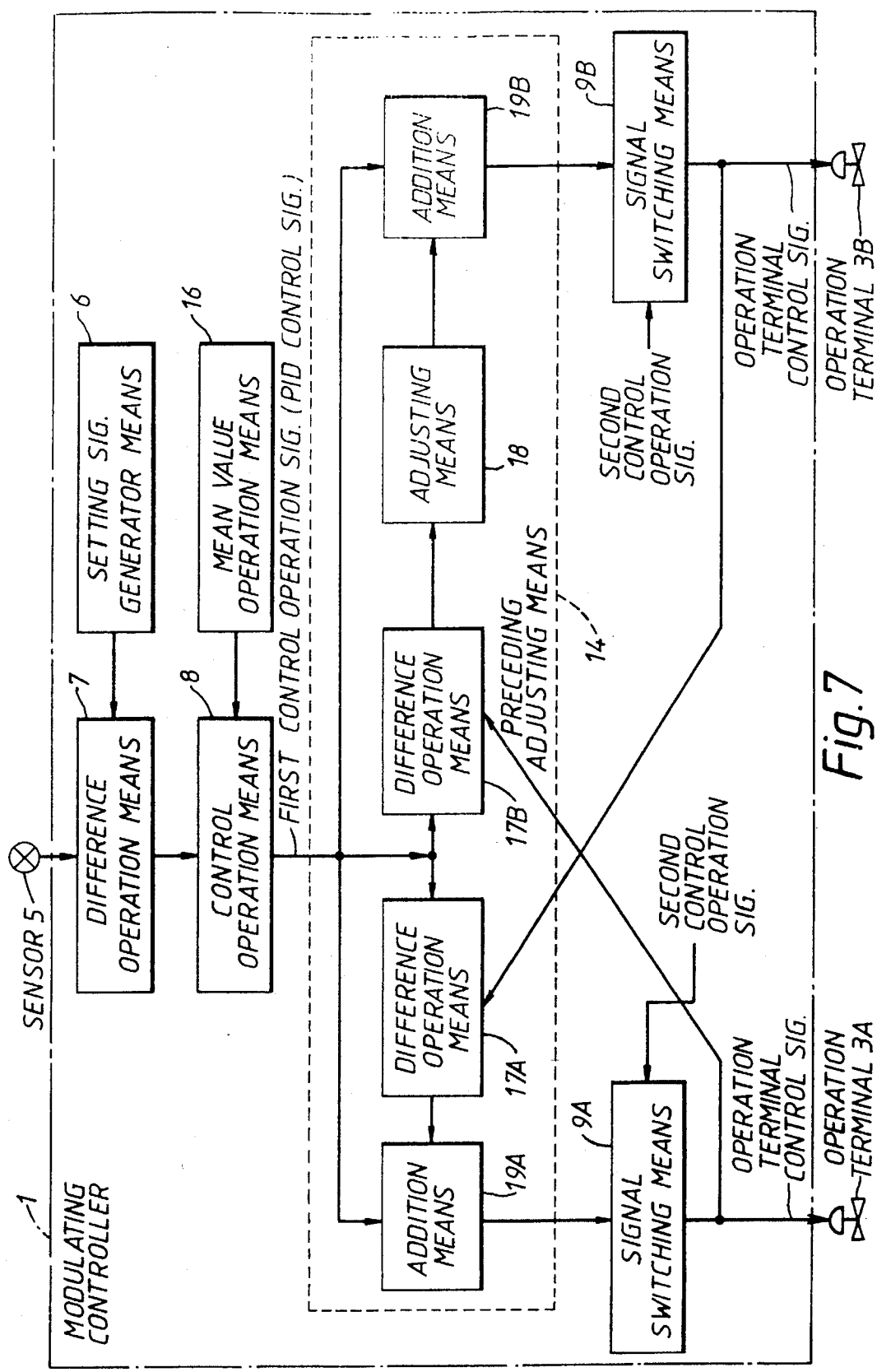
FIG. 7 is a schematic block diagram of the first embodiment of this invention.

FIG. 7 is a schematic block diagram showing the first embodiment of the modulating controller of this invention. The reference numerals which are the same with those used in FIG. 2 show the same parts or corresponding parts. The modulating controller 1 shown in the first embodiment is subjected to the two operation terminals of the plant shown in FIG. 1, and the operation terminal is the same rated flow rate and can flow the flow rate of not less than 100% in the total flow rate of the two operation terminals.

The modulating controller 1 comprises the setting signal generator means 6, the difference operation means 7, control operation means 8, preceding adjusting means 14, signal switching means 9A, 9B (e.g. H/A station or signal transfer), and mean value operation means 16.

The setting signal generator means 6 outputs a certain set signal. The difference operation means 7 calculates the difference between the detection signal of the sensor 5 and the set signal of the setting signal generator means 8 and outputs the difference signal.

The control operation means 8 inputs the difference signal, calculates proportion, integral and differential, and outputs as the PID control signal (first control operation signal).

The preceding adjusting means 14 comprises difference operation means 17A, 17B, adjusting means 18, and addition means 19A, 19B. The preceding adjusting means 14 precedingly compensates the control signal of the operation terminal to the PID control signal, and can smoothly switch to a different control signal. The signal switching means 9A, 9B switches the signal from the addition means 19A, 19B and the other control signal (second control operation signal, e.g. manual operation signal) under a certain condition, and outputs the operation terminal control signal to the corresponding operation terminal 3A or operation terminal 3B.

The difference operation means 17A calculates the difference between the PID control signal and the operation terminal 3B control signal and outputs the difference signal. The difference operation means 17B calculates the difference between the PID control signal and the operation terminal 3A control signal and outputs the difference signal. The adjusting means 18 inputs the difference signal of the difference operation means 17B and controls a time lag when returning from the manual operation to the automatic operation by the PID control signal. The addition means 19A adds the PID control signal and the difference signal of the difference operation means 17A. The addition means 19B adds the PID control signal and the signal through the difference operation means 17B or adjusting means 18. The mean value operation means 18 executes tracking when both signal switching means 9A, 9B are manually operated. The mean value operation means 16 calculates the mean value of the operation terminal 3A control signal and the operation terminal 3B control signal and tracks the integral element of the control operation means 8 based on this mean value.

Now, the first embodiment shown in FIG. 7 will be described in detail with reference to the block diagram shown in FIG. 8.

The difference operation means 17B reduces from the PID control signal the operation terminal 3A control signal from the signal switching means 9A and obtains the difference between the PIP control signal and the operation terminal 3A control signal. When either of the signal switching means 9A, 9B is manually operated, the difference becomes positive or negative. When both of the signal switching means 9A, 9B are automatically operated, the difference becomes substantially 0%.

When both of the signal switching means 9A, 9B are automatically operated, preceding signal transfer means 18A outputs 0%. When either of the signal switching means 9A, 9B is manually operated, the preceding signal transfer means 18A outputs the output signal of the difference operation means 17B as it is. The lag means 18C, when the signal switching means 9A, 9B are automatically operated, gives a primary time lag to the output signal of the preceding signal transfer means 18A and outputs. When either of the signal switching means 9A, 9B is manually operated, the output signal of the preceding signal transfer means 18A bypasses the lag means 18C and is entered in the preceding signal transfer means 18B, and is then outputted from the preceding signal transfer means 18B as it is. The output signal of the preceding signal transfer means 18A is tracked to the integral element of the lag means 18C.

The addition means 19B adds the PID control signal and the output signal of the preceding signal transfer means 18B. The signal switching means 9B outputs the output signal of the addition means 19B as it is when under automatic operation, and outputs the signal manually operated by the operator when not under automatic operation.

On the other hand, the difference operation means 17A reduces the operation terminal 3B control signal from the PID control signal, and obtains the difference between the PID control signal and the operation terminal 3B control signal. When either of the signal switching means 9A, 9B is manually operated, the difference becomes positive or negative. When both of the signal switching means 9A, 9B are automatically operated, the difference becomes substantially 0%.

However, immediately after shifting of the signal switching means 9A, 9B into the automatic operation, by the action of the lag means 18C and the preceding signal transfer means 18B, there is a case of shifting in primary lag operation from the difference value occurred at manual operation toward 0. The same is applied to the difference operation means 17B.

The addition means 19A adds the PID control signal and the output signal of the difference operation means 17A. The signal switching means 9A outputs the output signal of the addition means 19A as it is under manual operation, and outputs the signal manually operated by the operator when not automatically operated.

Fixed value output means 18D outputs the signal of 0%. The mean value operation means 18, when both of the signal switching means 9A, 9B are manually operated, tracks the integral element of the control operation means 8 based on the value obtained by calculating the mean of the operation terminal 3A control signal and the operation terminal 3B control signal.

When CV characteristics of the operation terminal are not linear, since the operation terminals 3A, 3B are generally compensated, CV compensation means is omitted in this embodiment. When not compensated by the operation terminals 3A, 3B, the CV compensation means is designed to be disposed on the modulating controller 1.

Now, the action of this embodiment will be described in four ways.

(i) The signal switching means 9A, 9B are automatically operated.

(ii) The signal switching means 9A is manually operated and the signal switching means 9B is automatically operated.

(iii) The signal switching means 9A is automatically operated and the signal switching means 9B is manually operated.

(iv) The signal switching means 9A, 9B are manually operated.

In the following description, the PID control signal which is an output of the control operation means 8 shall be D, the operation terminal 3A control signal which is an output of the signal switching means 9A be A, and the operation terminal 3B control signal which is an output of the signal switching means 9B be B.

(i) As to a case when both of the signal switching means 9A, 9B are automatically operated, description will be made with reference to FIG. 9.

Figure 8:
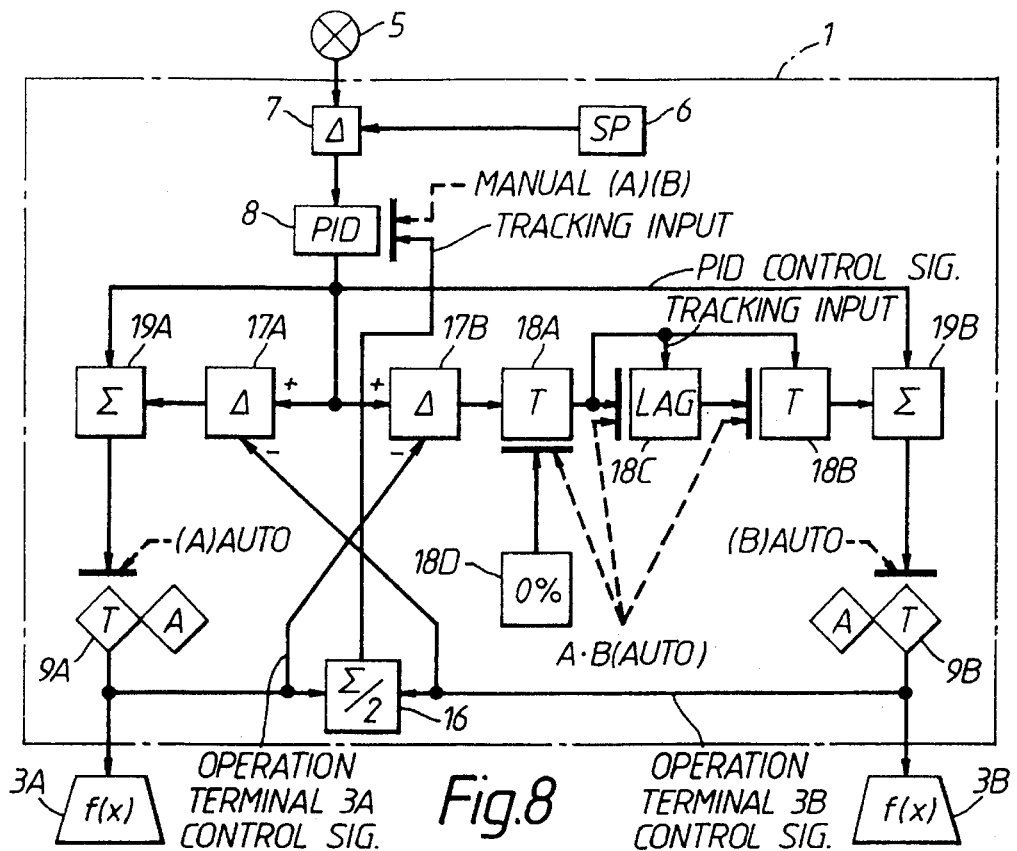
FIG. 8 is a detailed block diagram of the first embodiment of this invention.
Figure 9:
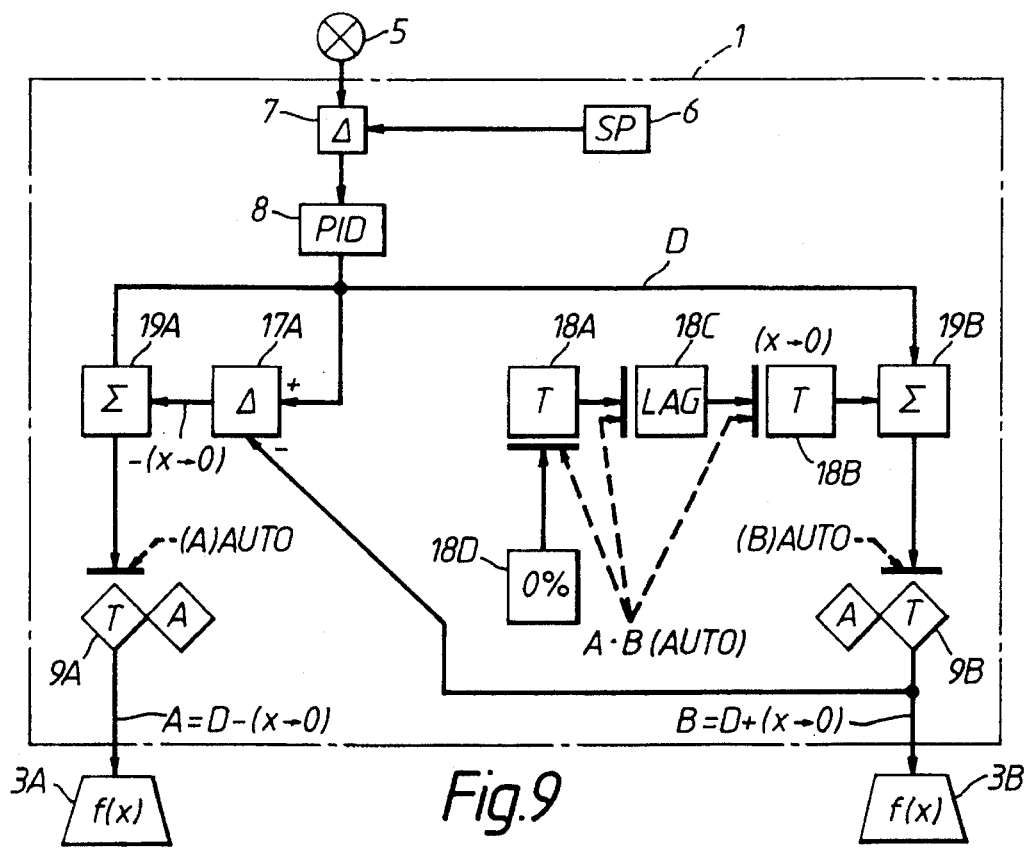
FIG. 9 is a block diagram showing the first action of FIG. 8.

FIG. 9 is a diagram which is an extract of the control block only executed when both of the signal switching means 9A, 9B are automatically operated in FIG. 8.

In the lab means 18C, when one or both of the signal switching means 9A, 9B are manually operated value x being tracked is changing (or 0) toward 0 with a primary delay, and this is expressed as $x \geq 0$. Therefore, the signal of $x \geq 0$ is outputted from the preceding signal transfer means 18B, and the addition means 19B outputs $D+(x \geq 0)$.

Since the signal switching means 9B is automatically operated this results in $B=D+(x \geq 0)$. The difference operation means 17A in which this signal is inputted outputs $D-[D+(x \geq 0)]=-(x \geq 0)$. And, the addition means 19A outputs $D-(x \geq 0)$. Since the signal switching means 9A is automatically operated, the operation terminal 3A control signal becomes $A=D-(x \geq 0)$.

As it is apparent from the above description, the operation terminal 3A control signal and the operation terminal 3B control signal, when they changes from the state that either one of them is manually operated to the state that both of them are automatically operated, operate with a primary delay without bump toward the PID control signal respectively. Then, when the output of the lab means 18C becomes 0, it results in A=D and B=D, and an ordinary automatic operation state is attained.

(ii) As to a case when the signal switching means 9A is manually operated and the signal switching means 9B is automatically operated, description will be made with reference to FIG. 10.

Figure 10:
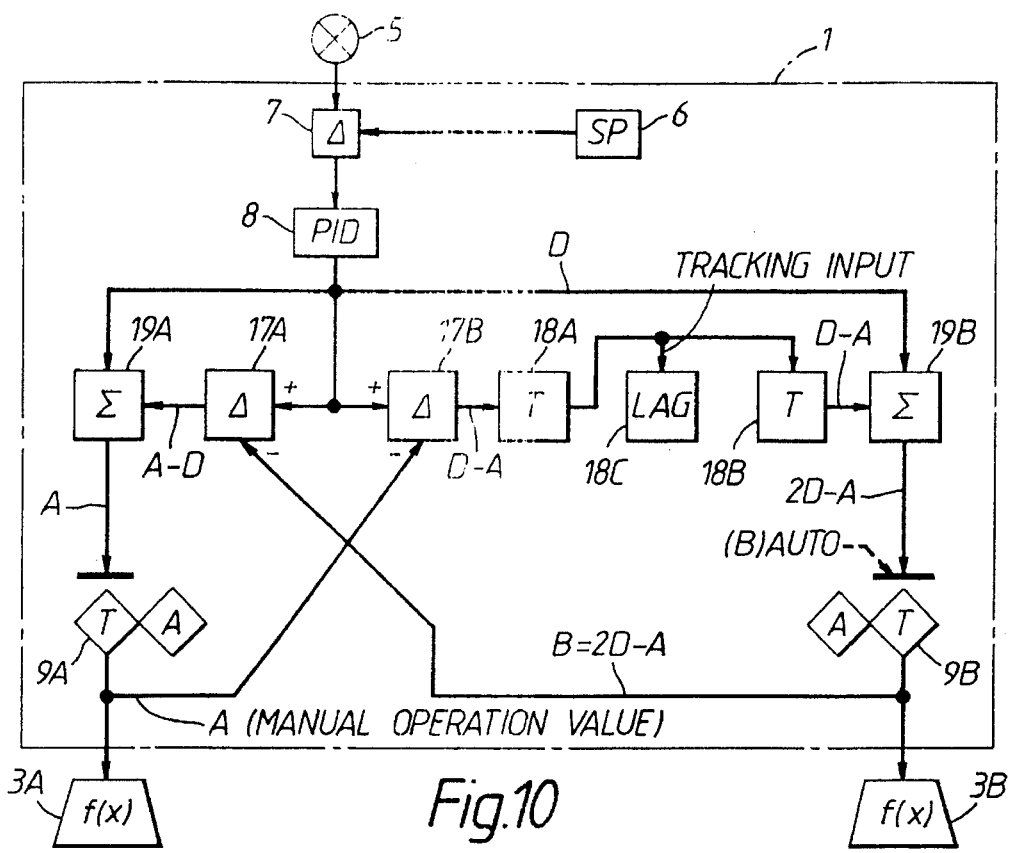
FIG. 10 is a block diagram showing the second action of FIG. 8.

FIG. 10 is a diagram which is an extract of the control block only executed when the signal switching means 9A is manually operated and the signal switching means 9B is automatically operated in FIG. 8.

In this case, the difference operation means 17B outputs D−A, and the preceding signal transfer means 18A also outputs D−A. The lab means 18C has D−A tracked. As a result, when the signal switching means 9A becomes automatic operation, the lag means 18C outputs $(D-A) \geq 0$ with a primary delay.

The addition means 19B outputs D+(D−A)=2D−A. Since the signal switching means 9B is automatically operated, the signal switching means 9B outputs B=2D−A. Specifically, since the value obtained by reducing A (manual operation value) from the entire operation terminal control signal of the operation terminals 3A and 3B is B, the control system is balanced as a whole.

On the other hand, the difference operation means 17A outputs D−(2D−A)=A−D, and the addition means 19A outputs A. That is to say, when the signal switching means 9A is switched into automatic operation, switching is made without bump.

(iii) As to a case when the signal switching means 9A is automatically operated and the signal switching means 9B is manually operated, description will be made with reference to FIG. 11.

Figure 11:
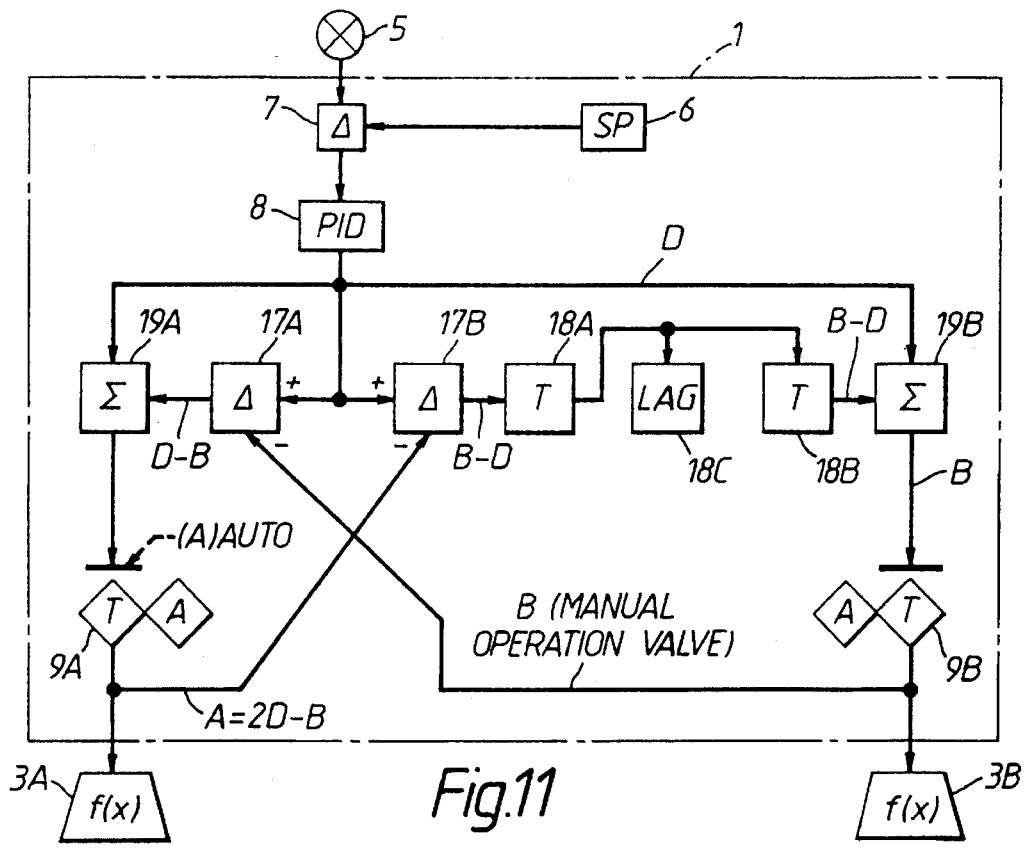
FIG. 11 is a block diagram showing the third action of FIG. 8.

FIG. 11 is a diagram which is an extract of the control block only executed when the signal switching means 9A is automatically operated and the signal switching means 9B is manually operated in FIG. 8.

In this case, the difference operation means 17A outputs D-B, and the addition means 19A outputs D+(D−B)=2D−B. Since the signal switching means 9A is automatically operated, the signal switching means 9A outputs A=2D−B. Specifically, since the value obtained by reducing B (manual operation value) from the entire operation terminal control signal of the operation terminals 3A and 3B is A, the control system is balanced as a whole.

On the other hand, the difference operation means 17B outputs D−(2D−B)=B−D, and the preceding signal transfer means 18A outputs B-D. At this time, the means 18C has B-D tracked. As a result, when the signal switching means 9B becomes automatic operation, $B-D \geq 0$ is outputted with a primary delay. The addition means 19B outputs D+(B−D)=B. That is to say, when the signal switching means 9B is switched to automatic operation, switching is made without bump.

(iv) As to a case when the signal switching means 9A and the signal switching means 9B are manually operated, description will be made with reference to FIG. 12.

Figure 12:
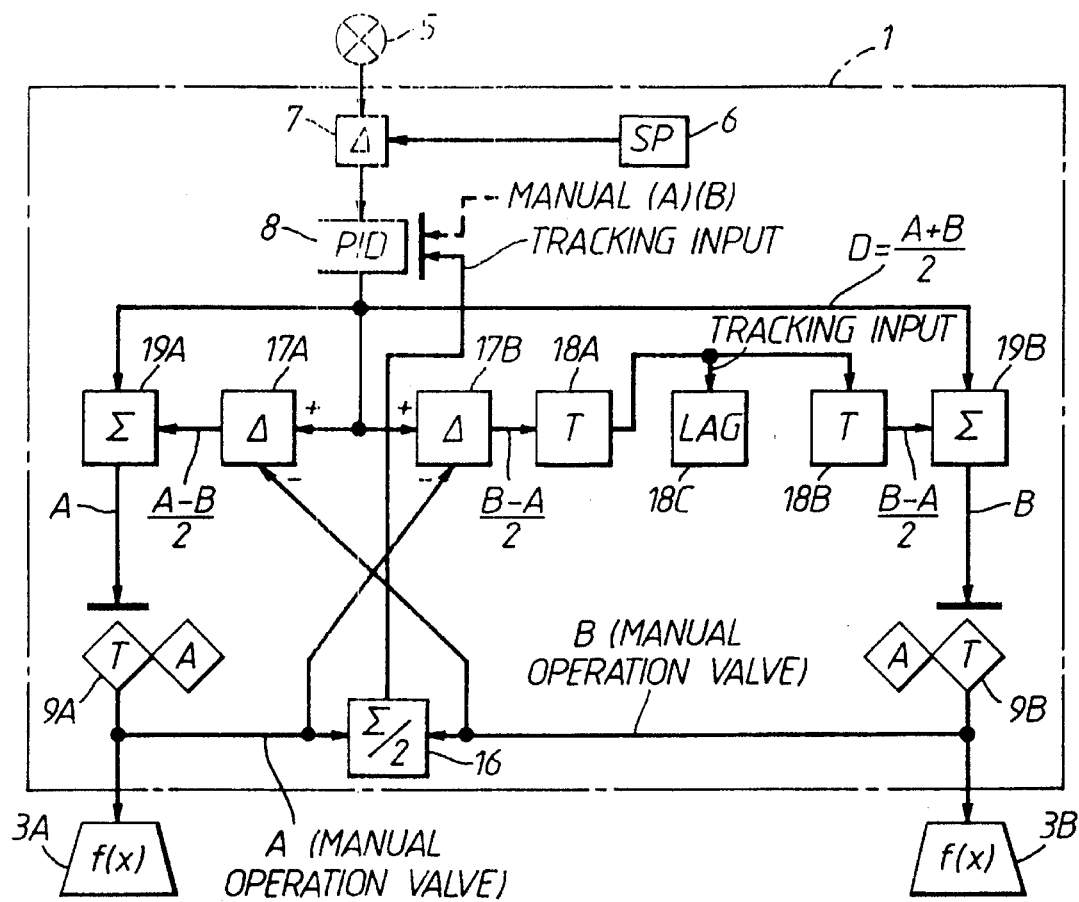
FIG. 12 is a block diagram showing the fourth action of FIG. 8.

FIG. 12 is a diagram which is an extract of the control block only executed when the signal switching means 9A and the signal switching means 9B are manually operated in FIG. 8.

In this case, the mean value (A+B)/2 of A and B is tracked to the integral element of the control operation means 8 by the mean value operation means 16, resulting in D =(A+B)/2. Thereby, the difference operation means 17B outputs $[(A+B)/2]-A=[(B-A)/2]$, and the preceding signal transfer means 18A outputs (B−A)/2. And, the addition means 19B outputs [(A+B)/2]+[(B−A)/2]=B.

On the other hand, the difference operation means 17A outputs [(A+B)/2]−B=(A−B)/2, and the addition means 19A outputs [(A+B)/2]+[(A−B)/2]=A. That is to say, whenever the signal switching means 9A, 9B are returned to automatic operation, switching is made without bump.

Figure 13:
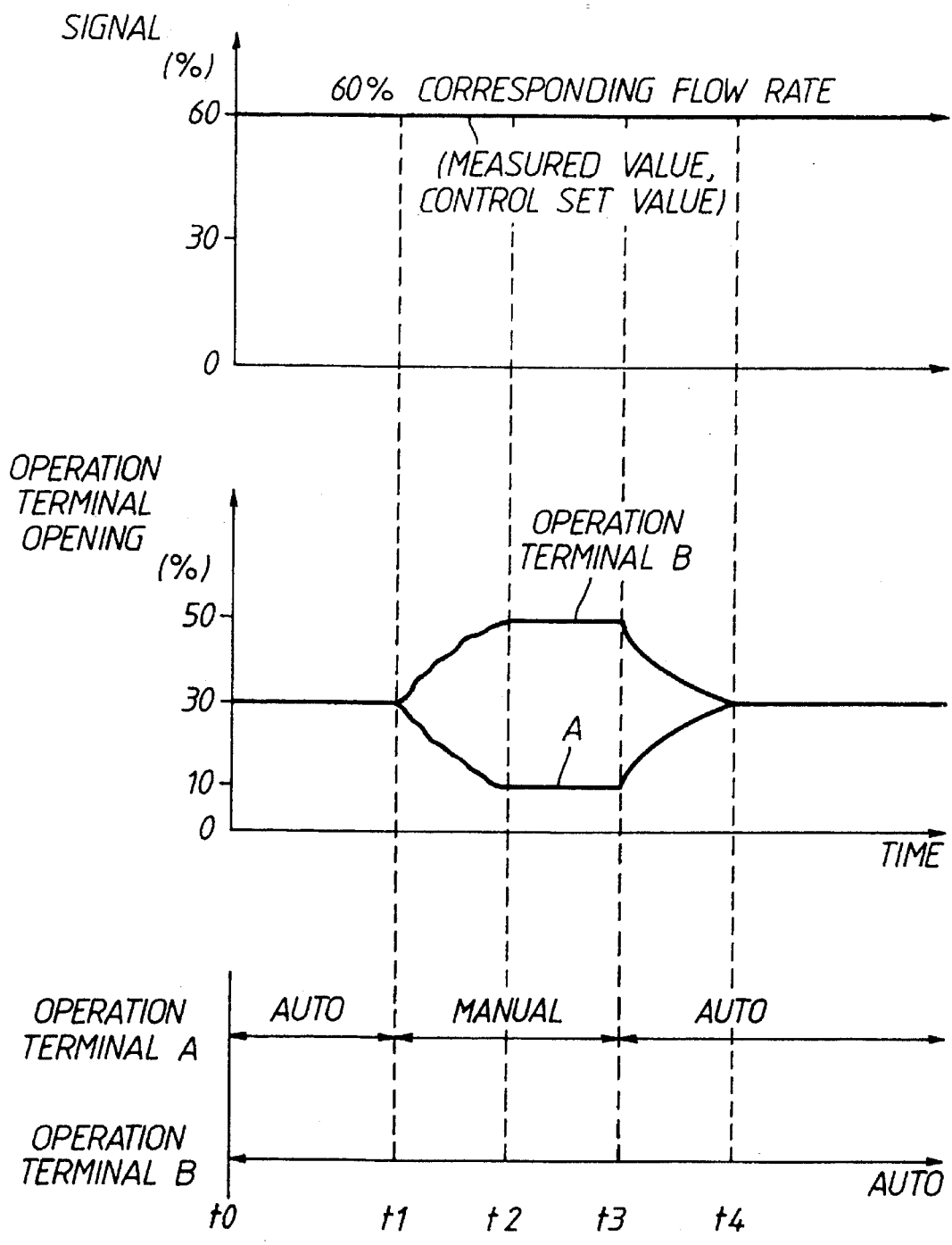
FIG. 13 is a time chart showing an embodiment of the action of FIG. 8.

Now, one example of the action of the first embodiment will be described using an actual value with reference to FIG. 13.

First, when both of the signal switching means 9A, 9B are automatically operated, the control block of FIG. 9 is applied. In FIG. 13, x is 0 (x=0) as shown in FIG. 9. As shown by time t0 to time t1 of FIG. 13, to obtain the flow rate corresponding to 60%, under the condition that the PID control signal is outputted by 30% each from the control operation means 8 to the operation terminal 3A and the operation terminal 3B, the control system is stabilized.

In this case, the preceding signal transfer means 18A selects 0% of the fixed value output means 18D. And, the control system has been already stabilized and the output of the preceding signal transfer means 18B has also reached 0%. Therefore, the addition means 19B outputs 30% by the addition of 30% of the PID control signal and 0% of the output of the preceding signal transfer means 18B. As the signal switching means 9B is automatically operated, 30% is outputted as it is, and the operation terminal 3B control signal becomes 30%.

On the other hand, the difference operation means 17A calculates the difference between 30% of the PID control signal and 30% of the operation terminal 3B control signal and outputs 0%. The addition means 19A adds 30% of the PID control signal and 0% of the output of the difference operation means 17A and outputs 30%. As the signal switching means 9A is automatically operated, 30% is outputted as it is. As described above, the PID control signal is stably outputted to both of the operation terminals 3A, 3B in 30%.

Then, at time t1, the signal switching means 9A becomes manual operation and gradually lowers the operation terminal 3A control signal, and at time t2, the operation terminal 3A control signal is supposed to become 10%. In this case, the control block of FIG. 10 is applied. The difference operation means 17B calculates the difference between 30% of the PID control signal and 10% of the operation terminal 3A control signal. And, the preceding signal transfer means 18B also outputs 20%. At this time, the lag means 18C has a value of 20% tracked. The addition means 19B adds 30% of the PID control signal and 20% of the output of the preceding signal transfer means 18B and outputs 50%.

Since the signal switching means 9B is automatically operated, 50% is outputted as it is, and the operation terminal 3B control signal becomes 50%. At this time, the operation terminal 3A control signal is manually operated from 30% to 10%, so that the operation terminal 3B control signal gradually changes from 30% to 50% correspondingly, and at time t2, it becomes 50%. Thus, for the opening of the operation terminals required to flow the flow rate corresponding to 60% to both operation terminals 3A, 3B, a large disturbance is not given to the process.

On the other hand, the difference operation means 17A calculates the difference between 30% of the PID control signal and 50% of the operation terminal 3B control signal and outputs −20%. And, the addition means 19A adds 30% of the PID control signal and −20% of the output of the difference operation means 17A and outputs 10%. Then, at time t2, the output of the addition means 19A is equal to the opening 10% of manual operation. Therefore, under this condition, even if the signal switching means 9A is suddenly returned to automatic operation, the operation terminal 3A control signal is switched without bump.

At time t3, when both of the signal switching means 9A, 9B become automatic operation, the control block of FIG. 9 is applied. And, the preceding signal transfer means 18A outputs the fixed value of 0%. Tracking of the lag means 18C is also released and lowers with a time lag to a target of 0% from the tracked 20%. Accordingly, the operation terminal 3B control signal is also lowered gradually.

At time t4 after that, the output of the lag means 18C becomes 0%. The operation terminal 3A control signal becomes 30% which is equal to the PID control signal. In this process, the output of the difference operation means 17A increases from −20% to 0%, and the operation terminal 3A control signal is also returned gradually to 30% of the PID control signal.

Thus, a sum of the openings of the operation terminals 3A, 3B is always 60%. This is a value equal to two times of the PID control signal, and means to have kept the opening required to obtain the flow rate corresponding to 60%. Therefore, when compared with the conventional device shown in FIG. 2, disturbance given to the process system is quite small.

When both of the signal switching means 9A, 9B are manually operated, at the time of returning to automatic operation, shifting to automatic operation can be made without bump, and disturbance to the process system can be suppressed to be quite small.

Figure 3:
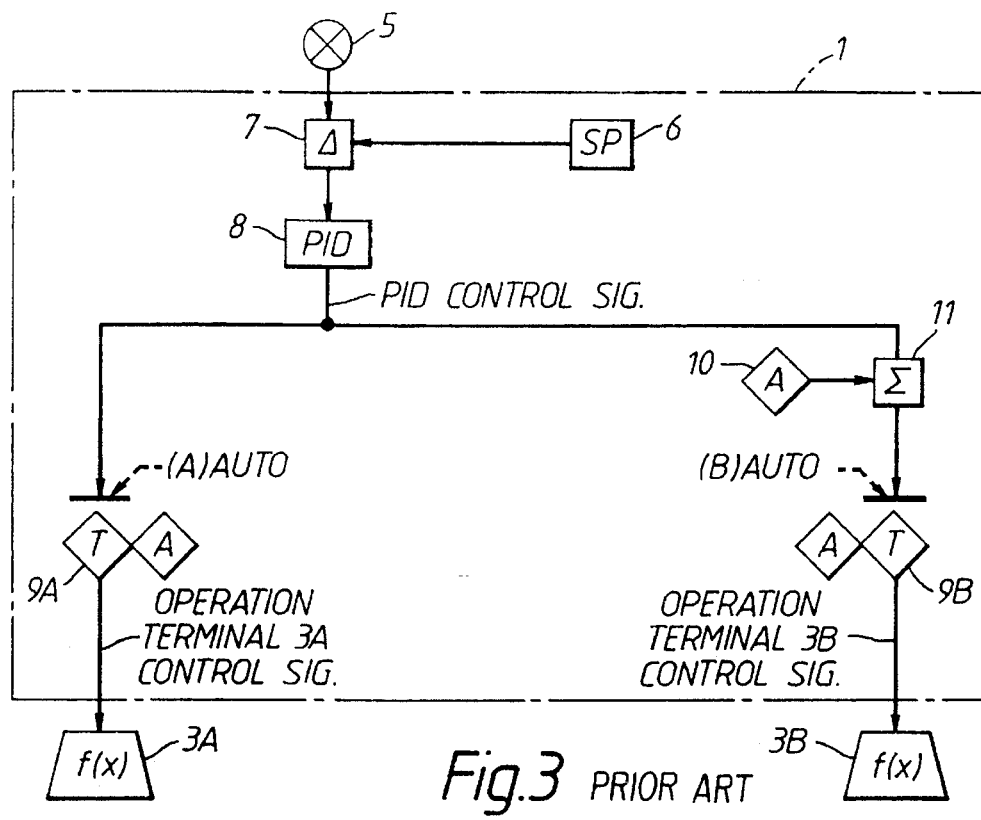
FIG. 3 is a block diagram showing a conventional modulating control let.
Figure 4:
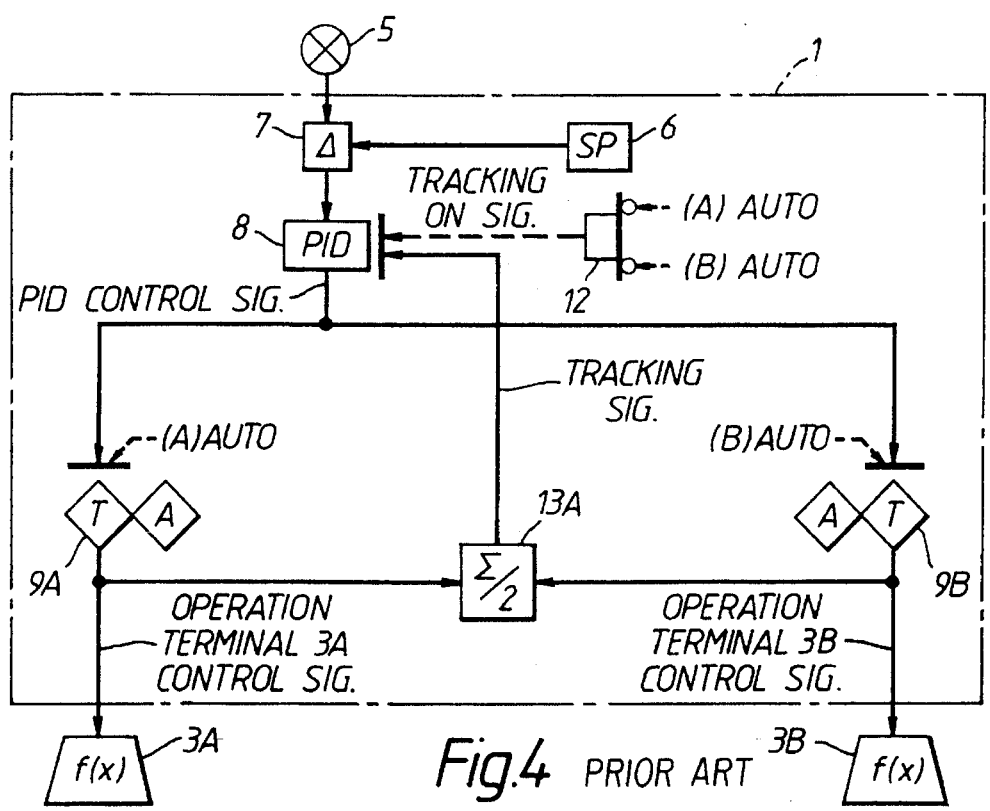
FIG. 4 is a block diagram showing a conventional modulating control let.
Figure 5:
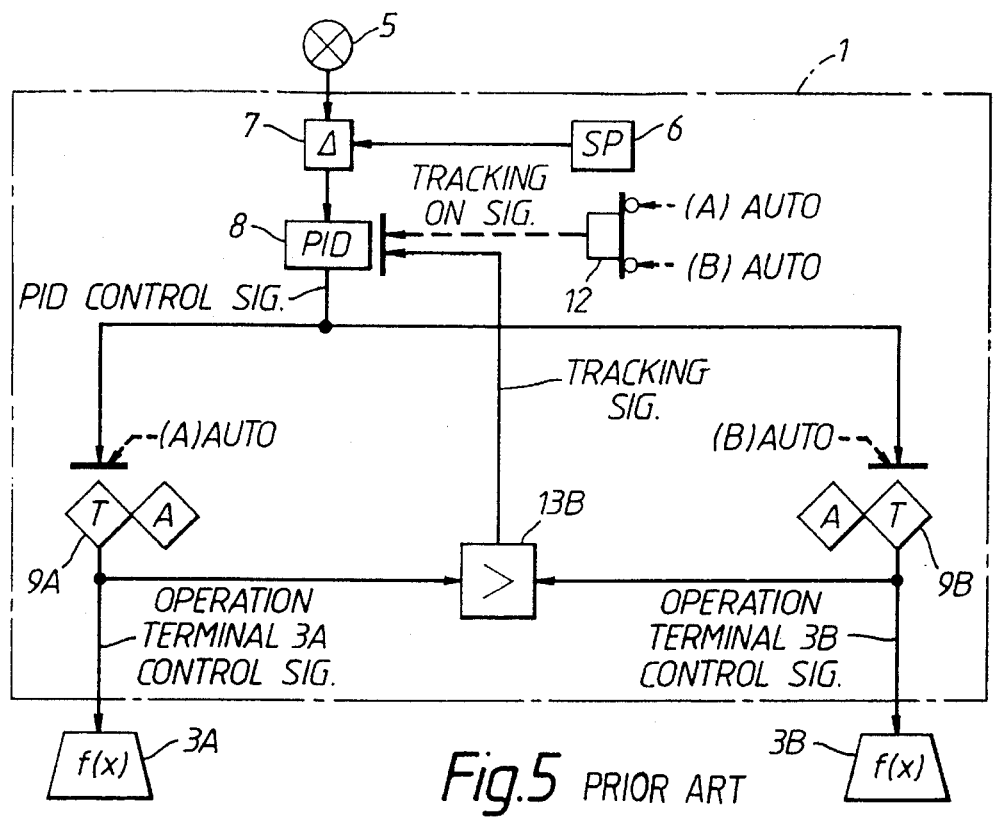
FIG. 5 is a block diagram showing a conventional modulating control let.
Figure 6:
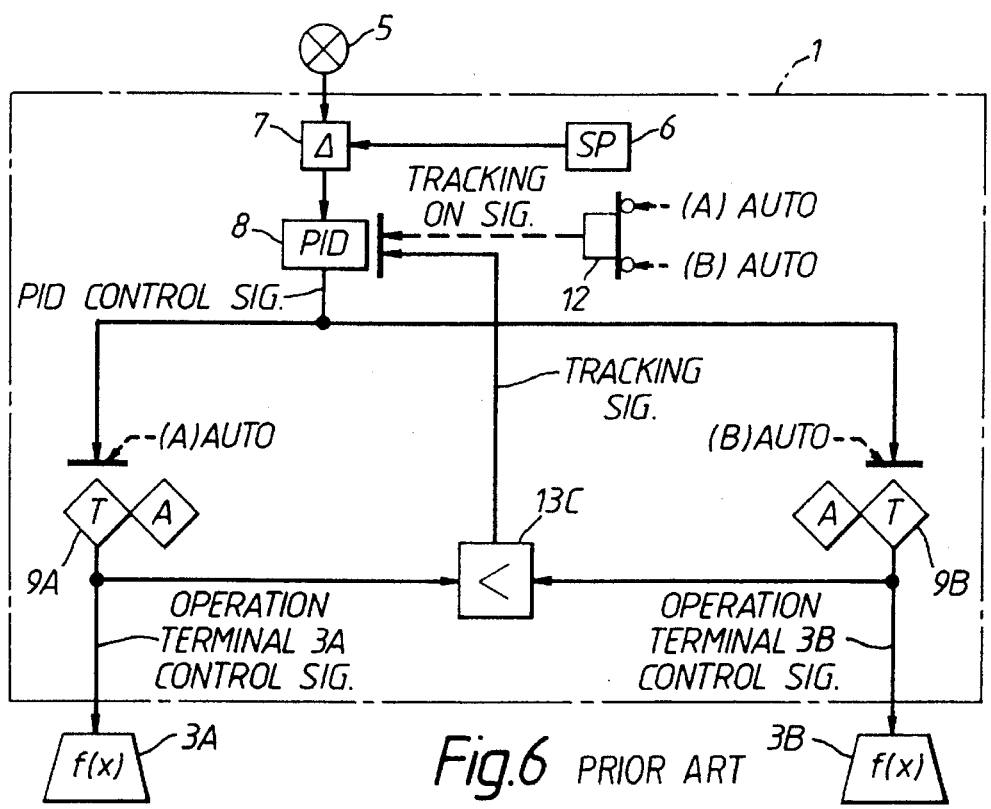
FIG. 6 is a block diagram showing a conventional modulating controller.
Figure 14:
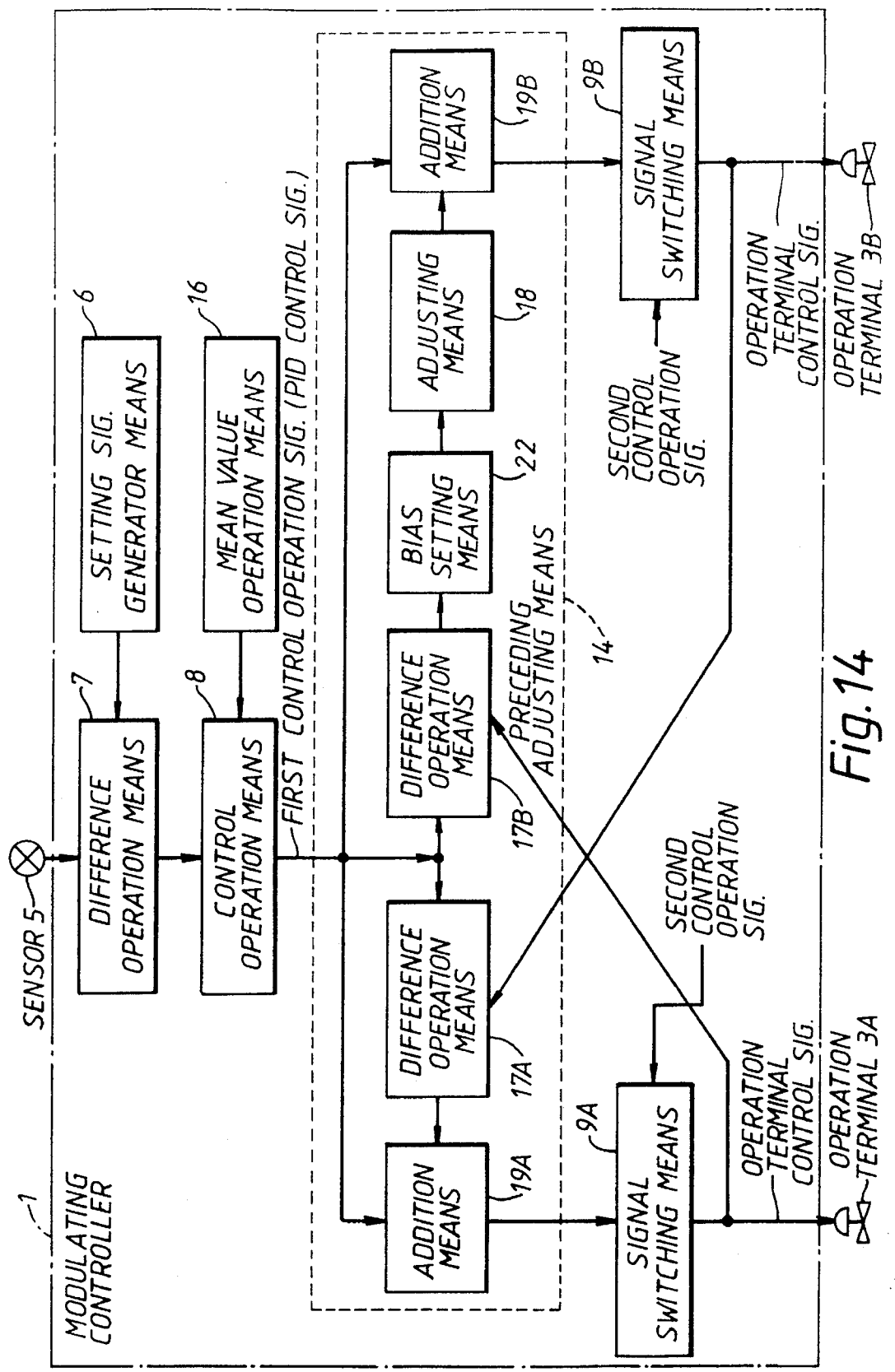
FIG. 14 is a schematic block diagram showing the second embodiment of this invention.

FIG. 14 is a schematic block diagram showing the second embodiment of the modulating controller of this invention. The reference numerals which are the same with those used in FIG. 3 show the same parts or corresponding parts. The modulating controller 1 shown in the second embodiment is subjected to the two operation terminals of the plant shown in FIG. 1, the operation terminals are the same rated flow rate, and can flow the flow rate of 100% or more in total of the two operation terminals.

The modulating controller comprises the setting signal generator means 6, the difference operation means 7, the control operation means 8, the preceding adjusting means 14, the signal switching means (e.g. H/A station or signal transfer) 9A, 9B, and the mean value operation means 16.

The preceding adjusting means 14 comprises the difference operation means 17A, 17B, the bias setting means 22, the adjusting means 18, and the addition means 19A, 19B.

Then, the second embodiment shown in FIG. 14 will be described in detail with reference to the block diagram shown in FIG. 15.

The setting signal generator means 6 outputs a certain set signal. The difference operation means 7 calculates the difference between the detection signal of the sensor and the set signal of the setting signal generator means 6 and outputs the difference signal.

The control operation means 8 inputs the difference signal, calculates proportion, integral and differential, and outputs as the PID control signal (first control operation signal).

The difference operation means 17B reduces from the PID control signal the operation terminal 3A control signal from the signal switching means 9A, and obtains the difference between the PID control signal and the operation terminal 3A control signal.

When both of the signal switching means 9A, 9B are automatically operated, the preceding signal transfer means 18A outputs the bias value set by the bias setting means 22. When either of the signal switching means 9A, 9B is manually operated, the preceding signal transfer means 18A outputs the output of the difference operation means 17B as it is. The lag means 18C, when both of the signal switching means 9A, 9B are automatically, operated, outputs the output signal of the preceding signal transfer means 18A with a primary delay. When either of the signal switching means 9A, 9B is manually operated, the output signal of the preceding signal transfer means 18A bypasses the lag means 18C and inputted in the preceding signal transfer means 18B, then outputted from the preceding signal transfer means 18B as it is. And, the output signal of the preceding signal transfer means 18A is tracked to the integral element of the lag means 18C.

The addition means 19B adds the PID control signal and the output signal of the preceding signal transfer means 18B. The signal switching means 9B outputs the output signal of the addition means 19B as it is when automatically operated and outputs the signal manually operated by the operator when not automatically operated.

On the other hand, the difference operation means 17A reduces the operation terminal 3B control signal from the PID control signal, and obtains the difference between the PID control signal and the operation terminal 3B control signal.

The addition means 19A adds the PID control signal and the output signal of the difference operation means 17A. The signal switching means 9A outputs the output signal of the addition means 19A as it is when automatically operated and outputs the signal manually operated by the operator when not automatically operated.

When both of the signal switching means 9A, 9B are manually operated, based on the value obtained by calculating the mean of the operation terminal 3A control signal and the operation terminal 3B control signal, the mean value operation means 16 tracks the integral elements of the control operation means 8.

Now, the action of the second embodiment will be described in four ways.

(i) The signal switching means 9A, 9B are automatically operated.

(ii) The signal switching means 9A is manually operated and the signal switching means 9B is automatically operated.

(iii) The signal switching means 9A is automatically operated and the signal switching means 9B is manually operated.

(iv) The signal switching means 9A, 9B are manually operated.

In the following descriptions, the PID control signal which is an output of the control operation means 8 shall be D, the operation terminal 3A control signal which is an output of the signal switching means 9A be A, and the operation terminal 3B control signal which is an output of the signal switching means 9B be B.

(i) As to a case when both of the signal switching means 9A, 9B are automatically operated, description will be made with reference to FIG. 16.

Figure 15:
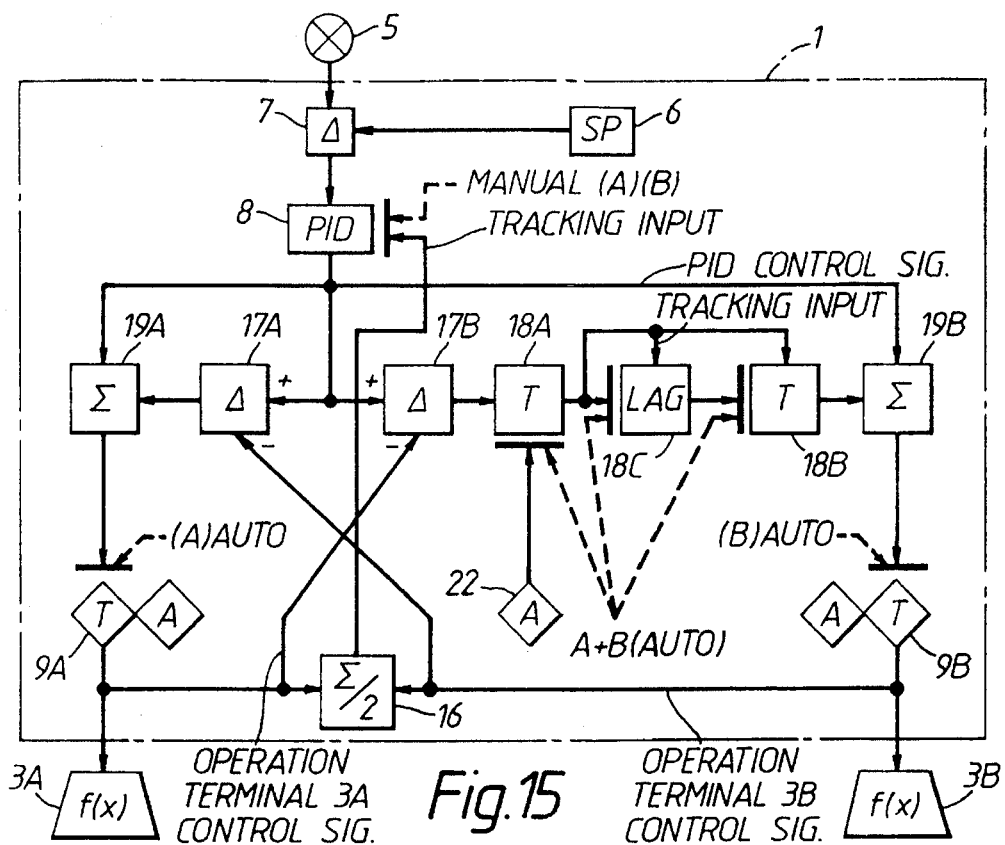
FIG. 15 is a detailed block diagram showing the second embodiment of this invention.
Figure 16:
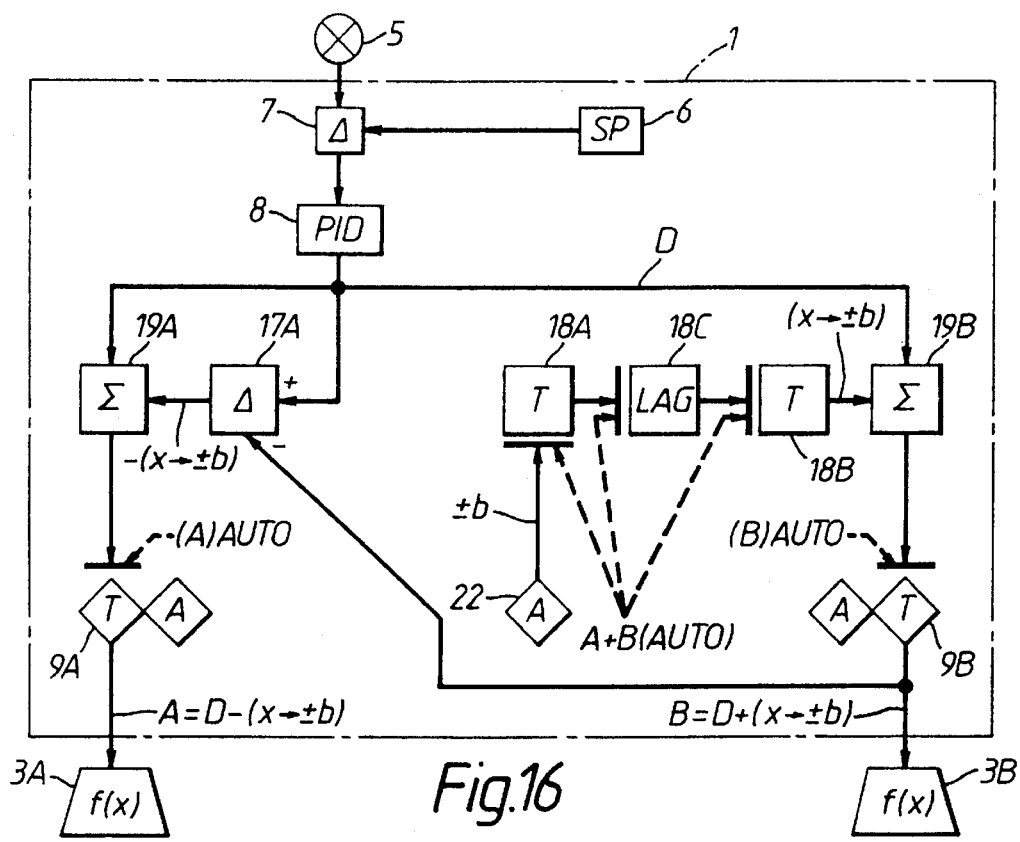
FIG. 16 is a block diagram showing the first action of FIG. 15.

FIG. 16 is a diagram which is an extract of the control block only executed when both of the signal switching means 9A, 9B are automatically operated in FIG. 15.

The bias set signal which is outputted by the bias setting means 22 shall be ±b. The output of the lag means 18C is changing with a primary delay from value x which was being tracked under manual operation toward the bias set signal ±b. This is expressed as $x \geq \pm b$. And, the preceding signal transfer means 18B also outputs $x \geq \pm b$. Therefore, the addition means 19B outputs $D+(x \geq b)$. As the signal switching means 9B is under automatic operation, B becomes $B=D+(x \geq b)$.

On the other hand, the difference operation means 17A calculates $D-B=D-[D+(x \geq \pm b)]= -(x \geq \pm b)$. And, the addition means 19A outputs $D+[-(x \geq \pm b)]=D- x \geq b)$. As the signal switching means 9A is automatically operated, the operation terminal 3A control signal becomes $A =D-(x \geq \pm b)$.

Thus, even if either of the signal switching means 9A, 9B becomes under automatic operation, each operates with a primary delay toward the PID control signal and operates without bump.

At this time, when the bias set signal is 0, the output of the lag means 18C changes from the tracked value x to 0 with the primary delay. And, when the output of the lag means 18C becomes 0, it results in A=D, B=D in an ordinary automatic control state.

On the other hand, when the bias set signal is not 0, the tracked value x changes to the bias set value signal ± b with the primary delay. The operation terminal control signal becomes $A=D-(x \geq \pm b)$, $B=D+(x \geq \pm b)$.

(ii) As to a case when the signal switching means 9A is manually operated and the signal switching means 9B is automatically operated, description will be made with reference to FIG. 17.

Figure 17:
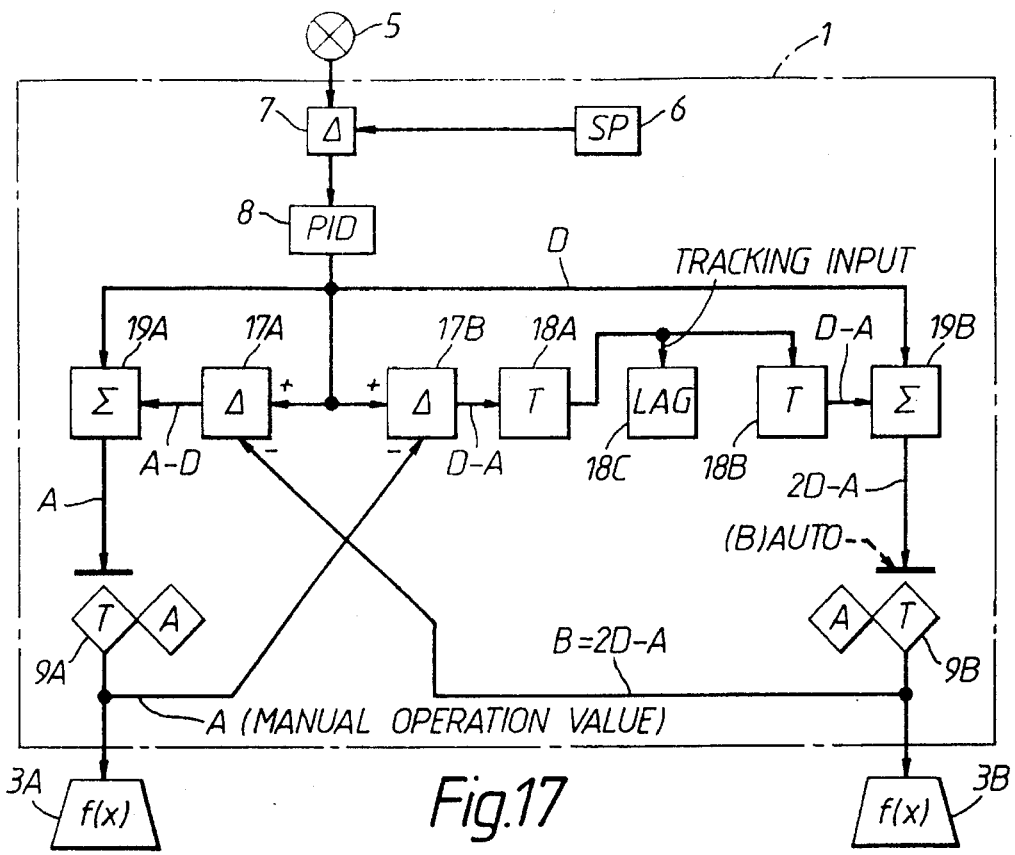
FIG. 17 is a block diagram showing the second action of FIG. 15.

FIG. 17 is a diagram which is an extract of the control block only executed when the signal switching means 9A is manually operated and the signal switching means 9B is automatically operated in FIG. 15.

In this case, the difference operation means 17B outputs D-A, and the preceding signal transfer means 18B also outputs D-A. At this time, the lag means 18C has D-A tracked, and when both of the signal switching means 9A, 9B becomes under automatic operation, the lag means 18C outputs D-A with the primary delay.

The addition means 19B outputs D+(D−A)=2D−A and the signal switching means 9B is automatically operated, so that B becomes B=2D−A. That is to say, by making a value obtained by reducing A (manual operation value) from the total operation terminal control signal to the operation terminals 3A, 3B, and the control system is balanced.

On the other hand, the difference operation means 17A outputs D−(2D−A)=A−D, and the addition means 19A outputs A. That is to say, when the signal switching means 9A is switched to automatic operation, switching is made without bump.

(iii) As to a case when the signal switching means 9A is automatically operated and the signal switching means 9B is manually operated, description will be made with reference to FIG. 18.

Figure 18:
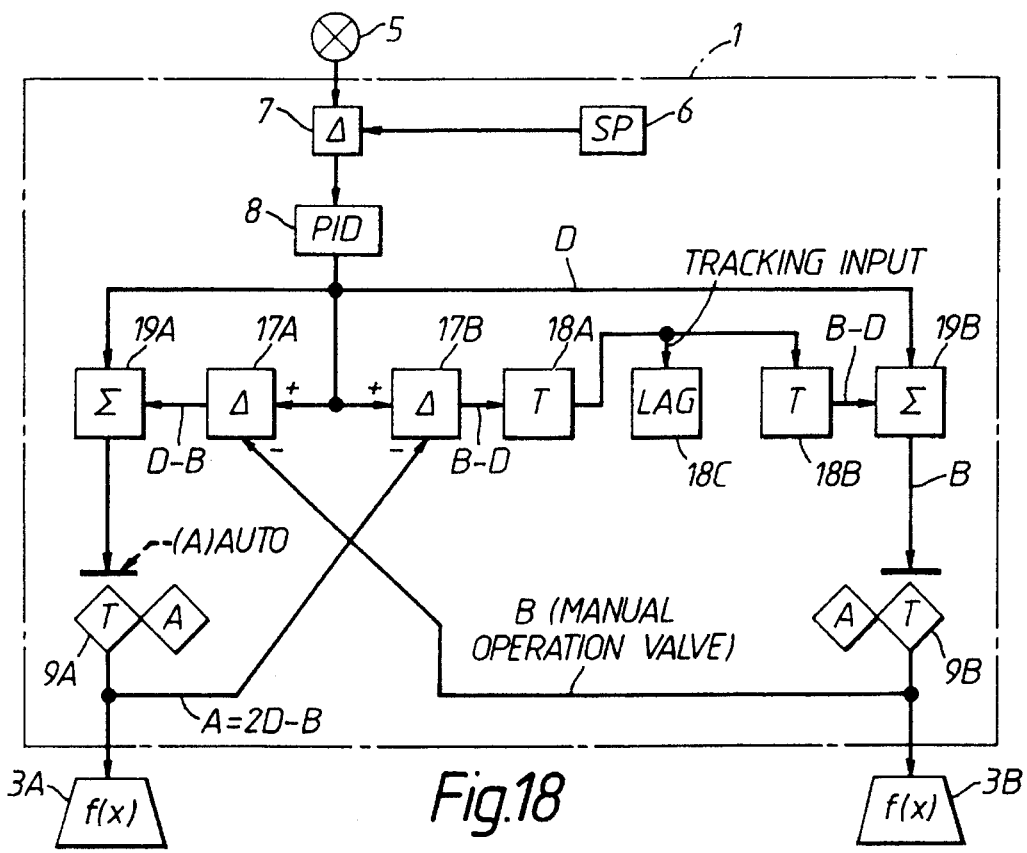
FIG. 18 is a block diagram showing the third action of FIG. 15.

FIG. 18 is a diagram which is an extract of the control block only executed when the signal switching means 9A is automatically operated and the signal switching means 9B is manually operated in FIG. 15.

In this case, the difference operation means 17A outputs D-B, and the addition means 19A outputs D+(D−B) =2D−B. Since the signal switching means 9A is automatically operated, A becomes A=2D−B. Specifically, since the value obtained by reducing B (manual operation value) from the entire operation terminal control signal of the operation terminals 3A, 3B is A, the control system is balanced.

The difference operation means 17B outputs D−(2D−B) =B−D, and the preceding signal transfer means 18B also outputs B-D. At this time, the lag means 18C has B-D tracked. And, when the signal switching means 9A, 9B becomes under automatic operation, the lag means 18C outputs B−D≧±b with the primary delay. The addition means 19B outputs D+(B−D). Thus, when the signal switching means 9B is switched to automatic operation, switching is made without bump.

(iv) As to a case when the signal switching means 9A and the signal switching means 9B are manually operated, description will be made with reference to FIG. 19.

Figure 19:
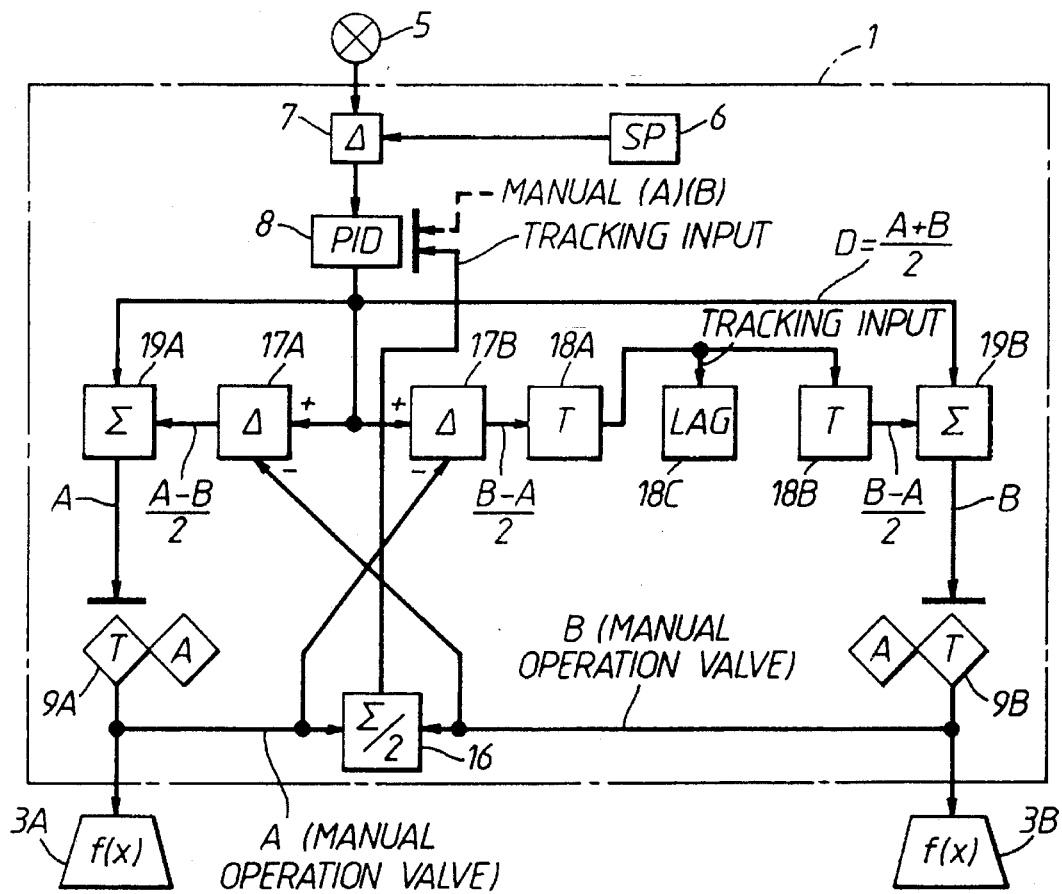
FIG. 19 is a block diagram showing the fourth action of FIG. 15.

FIG. 19 is a diagram which is an extract of the control block only executed when the signal switching means 9A and the signal switching means 9B are manually operated in FIG. 15.

In this case, the mean value operation means 16 calculates the mean value (A+B)/2 of A and B. This value is tracked to the integral element of the control operation means 8, results in D=(A+B)/2. The difference operation means 17B outputs (A+B)/2−A=(B−A)/2, and the preceding signal transfer means 18B also outputs (B−A)/2. Therefore, the addition means 19B outputs [(A+B)/2]+[(B− A)/2)=B.

On the other hand, the difference operation means 17A outputs [(A+B)/2]−B=[(A−B)/2]. The addition means 19A outputs [(A+B)/2]+[(A−B)/2]=A. Thus, whenever the signal switching means 9A, 9B return to automatic operation, switching is made without bump.

Now, one example of the action of the second embodiment will be described with reference to FIG. 20.

First, when both of the signal switching means 9A, 9B are automatically operated, the control block of FIG. 16 is applied. Between time t0 and time t1, to obtain the flow rate corresponding to 60%, the control system is stabilized in the state that the PID control signal of 30% is respectively outputted to the operation terminals 3A, 3B. Here, the bias set signal shall be ±0%.

In this case, as the control system is stabilized with the bias set signal of ±0%, the output of the preceding signal transfer means 18A, 18B has reached 0%. Therefore, the addition means 19B outputs 30% of the PID control signal. As the signal switching means 9B is automatically operated, the operation terminal 3B control signal becomes 30%.

Then, the difference operation means 17A calculates the difference between 30% of the PID control signal and 30% of the operation terminal 3B control signal, and outputs 0%. The addition means 19A adds 30% of the PID control signal and 0% of the output of the difference operation means 17A, and outputs 30%. As the signal switching means 9A is automatically operated, 30% is outputted as it is.

Now, the action of a case that the bias set signal of the bias setting means 22 is restricted to +20% will be described.

As described above, between time t0 and time t1, the bias set signal is ±0%. And, 30% of the PID control signal is respectively outputted to the operation terminals 3A, 3B, and the control system is stabilized. Under this condition, at time t1, when the bias set signal is +20%, the control block of FIG. 16 is applied. The bias setting means 22 outputs +20%, and the preceding signal transfer means 18A also outputs +20%. Thus, the lab means 18C has inputted. And, the lag means 18C gradually changes from 0% to +20% with the primary delay and outputs. This output of the lag means 18C is inputted in the preceding signal transfer means 18B. And, the preceding signal transfer means 18B outputs the inputted signal as it is. The addition means 19B adds the PID control signal and the signal outputted by the preceding signal transfer means 18B and outputs. By the operation of the lag means 18C with the primary delay, the addition means 19B gradually outputs 30% ≧50%. As the signal switching means 9B is under automatic operation, its output varies from 30% to 50%, and the operation terminal 3B control signal varies from 30% of time t1 50% of time t2.

The difference operation means 17A calculates the difference between 30% of the PID control signal and 30% ≧ 50% of the operation terminal 3B control signal and outputs 0%≧−20%. And, the addition means 19A adds 30% of the PID control signal and 0%≧−20% of the output of the difference operation means 17A and outputs 30≧10%. As the signal switching means 9A is automatically operated, 30% ≧10% are outputted. At this time, the calculation results of the difference operation means 17B vary from 0% to 20% according to the change of the operation terminal 3A control signal from 30% to 10%. Therefore, when the bias setting is made during the automatic operation of both of the signal switching means 9A, 9B, in stationary state, the output of the difference operation means 17B becomes equal to the bias set signal.

Under this state, at time t3, the signal switching means 9A is automatically operated. Then, shift is made from the control block of FIG. 16 to the control block of FIG. 19. Specifically, when the signal switching means 9A becomes under manual operation, the input of the preceding signal transfer means 18A is switched from the input of the bias setting signal to the input of the difference operation means 17B. At the time, the bias set signal (20%) is equal to the output signal (20%) of the difference operation means 17B. 20% of the output signal of this difference operation means 17B is inputted in the addition means 19B through the preceding signal transfer means 18B. The addition means 19B is outputted in 50% to the signal switching means 9B. Therefore, even when the signal switching means 9A becomes manual operation, the operation terminal 3B does not change.

On the other hand, the difference operation means 17A inputs 50% of B and 30% of the PID control signal and outputs −20%. And, as the addition means 19A outputs 10%, switching is made from automatic operation to manual operation without bump. Then, the operation amount of the signal switching means 9A is gradually increased to reach 30% in time t4, and kept at a certain level, then the operation terminal 3B control signal of the signal switching means 9B is also stabilized.

Thus, when both of the signal switching means 9A, 9B are automatically operated, the bias set value can be added to one operation terminal, and the other operation terminal operates to compensate the bias set value added content. Therefore, a total of the operation terminal control signals to the operation terminals 3A, 3B does not change. Therefore, disturbance given to the process can be suppressed to the minimum, and the control system can be stabilized sooner.

In the above first and second embodiments, the lag means 18C was described by the operation with the primary delay, but this does not restrict the invention to this. For example, a rate limiter can be used.

Figure 21:
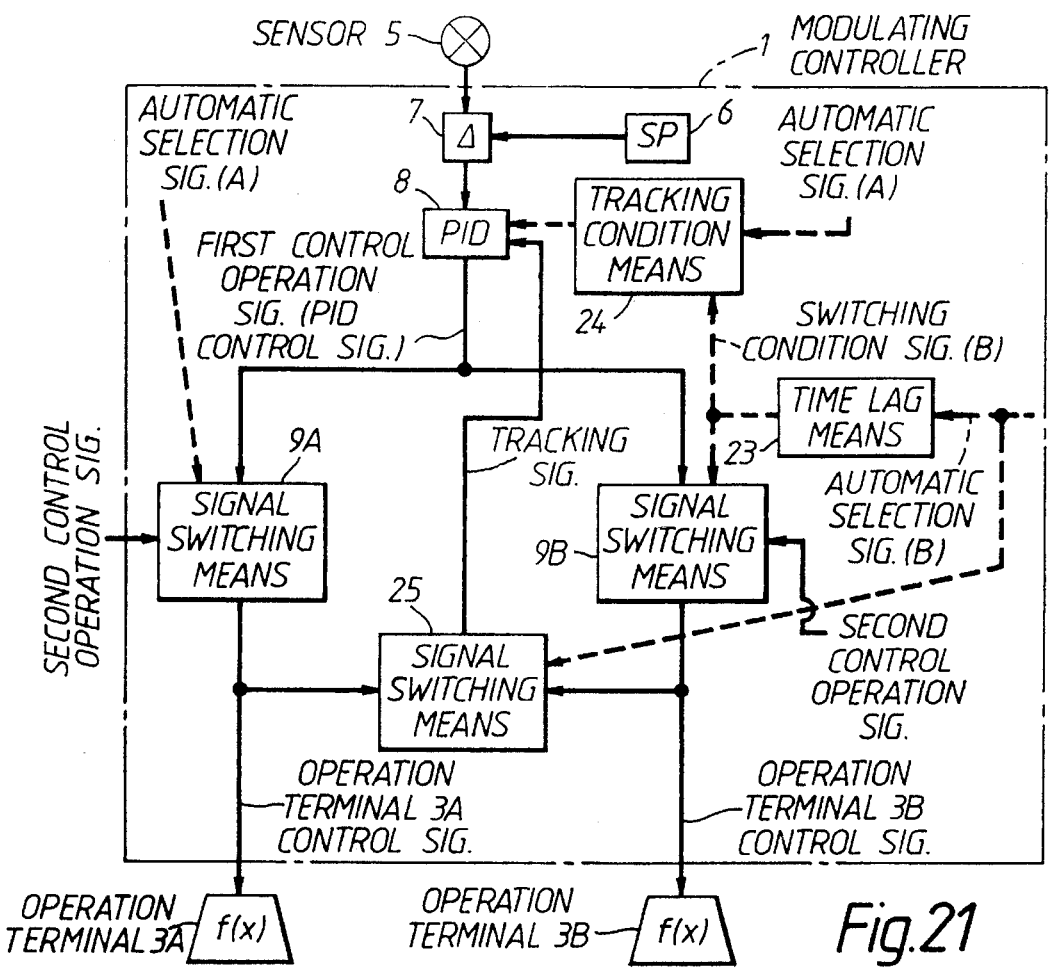
FIG. 21 is a schematic block diagram showing the third embodiment of this invention.

FIG. 21 is a schematic block diagram showing the third embodiment of the modulating controller of this invention.

The third embodiment is an example that the operation terminal A and the operation terminal B can flow the rated flow rate or more with one valve respectively. As the backup for one operation terminal, the other operation terminal is provided. And, the third embodiment has the construction that either one of the operation terminals is automatically operated in the plant structure shown in FIG. 1. And, the operation terminal control signal under automatic operation is tracked to the output value of manual operation by another means (not shown).

The modulating controller 1 comprises the setting signal generator means 6, the difference operation means the control operation means 8, the signal switching means (e.g.

H/A station or signal transfer) 9A, 9B, time lag means 23 (e.g. on delay timer), tracking condition means 24, and signal switching means 25.

The setting signal generator means 6 outputs a certain set signal. The difference operation means 7 calculates the difference between the detected signal of the sensor 5 and the set signal of the setting signal generator means 6 and outputs the difference signal.

The control operation means 8 inputs the difference signal, calculates proportion, integral and differential, and outputs as the PID control signal (first control operation signal). The control operation means 8 outputs the PID control signal to either one of the two operation terminals and controls the process amount.

When the automatic selection signal A to output the control operation signal to the operation terminal 3A becomes an operatable signal (ON signal), the signal switching means is switched from the other control signal (second control operation signal, e.g. manual operation signal) to the PID control signal. And, when the automatic selection signal A becomes an operation stopping signal (OFF signal), the signal switching means 9A switches from the PID control signal to the other control signal. The output of the signal switching means 9A is outputted to the operation terminal 3A as the operation terminal 3A control signal.

The time lag means 23, when the automatic selection signal B to output the PID control signal to the operation terminal 3B becomes the operatable signal (ON signal) and after a certain time, outputs the operatable signal (ON signal) of switching condition signal B. When the automatic selection signal B becomes the operation stopping signal (OFF signal), the on delay timer means outputs the operation stopping signal (OFF signal) of the switching condition signal B.

The signal switching means 9B switches to the control operation signal when the switching condition signal B becomes the operatable signal (ON signal). When the switching condition signal B becomes the operation stopping signal (OFF signal), the signal switching means 9B switches to the other control signal (second control operation signal e.g. manual operation signal). The output of the signal switching means 9B is outputted to the operation terminal 3B as the operation terminal 3B control signal.

The signal switching means 25 switches to the operation terminal 3A control signal when the automatic selection signal A becomes the operatable signal (ON signal). When the automatic selection signal B becomes the operatable signal (ON signal), the signal switching means 25 switches to the operation terminal 3B control signal. And, the signal switching means 25 outputs the tracking signal to track to the PID control signal to the control operation means 8.

When the automatic operation signal A is the operatable signal (ON signal), the automatic selection signal B is the operation stopping signal (OFF signal). Therefore, in this embodiment, the signal switching means 25 inputs the automatic selection signal B only as the condition to switch the signal. And the signal switching means 25 switches to the operation terminal 3B control signal when the automatic selection signal B is the operatable signal (ON signal), and switches to the operation terminal 3A control signal when the automatic selection signal B is the operation stopping signal (OFF signal).

The tracking condition means 24, when both of the automatic selection signal A and the switching condition signal B become the operation stopping signal (OFF signal), outputs the tracking condition signal to track the tracking signal to the PID control signal to the control operation means 8.

Figure 22:
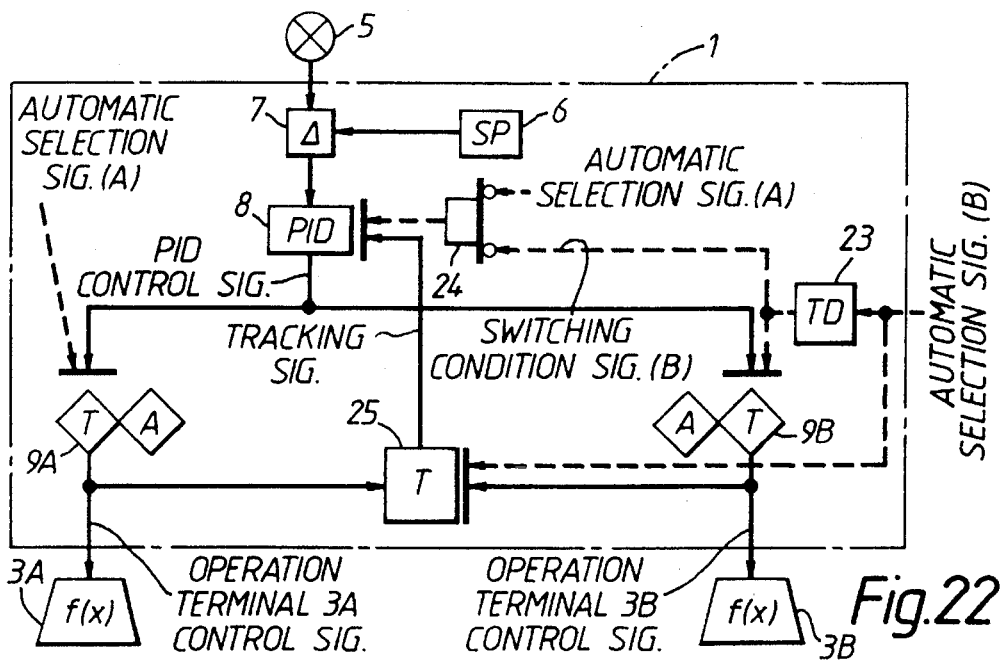
FIG. 22 is a detailed block diagram showing the third embodiment of this invention.
Figure 23:
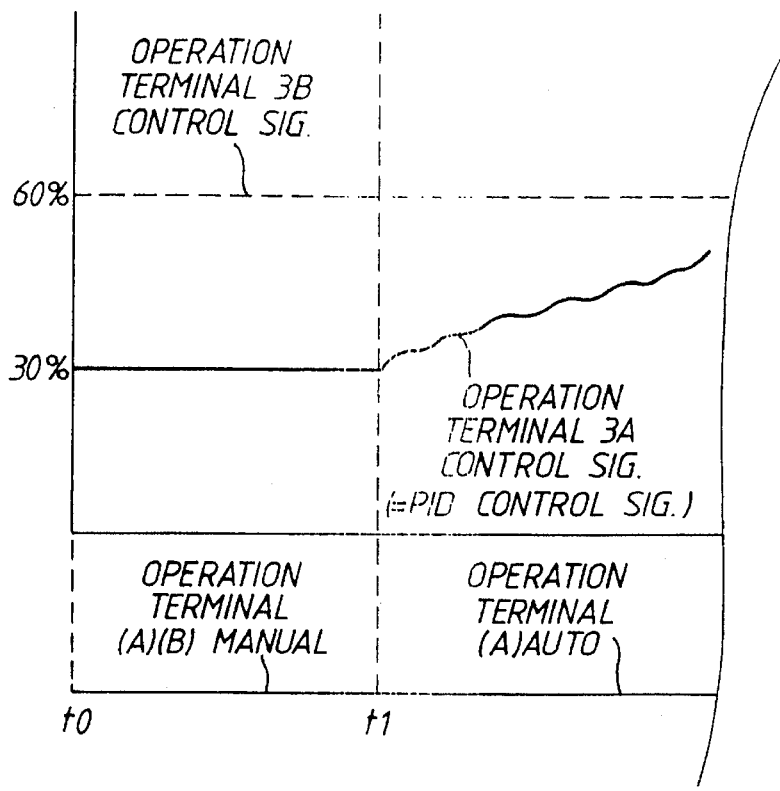
FIG. 23 is a time chart showing an embodiment of the action of FIG. 22.

Now, the third embodiment shown in FIG. 21 will be described in detail with reference to the block diagram shown in FIG. 22.

The difference operation means 7 calculates the difference between the measured signal value from the sensor and the set signal of the setting signal generator means 6. The control operation means 8 outputs the PID control signal according to the difference signal. The signal switching means 9A, 9B switch to the automatic operation when each automatic selection signal is ON signal, and switch to the manual operation when the automatic selection signal is OFF signal.

The time lag means 223 outputs the switching condition signal B with a delay of a certain time when the automatic selection signal B is ON signal, as the condition signal to switch the signal switching means 9B to the automatic operation. The signal switching means 9B is switched to the automatic operation a certain time after the automatic selection signal B becomes ON signal. When the automatic selection signal B becomes OFF signal, it instantly switches to the manual operation.

The tracking condition means 224 calculates the tracking execution condition to the control operation means 8. The tracking condition means 9.4 outputs the condition to execute the tracking by the completion of logical product of NOT of ON signal of the automatic selection signal A and NOT of ON signal of the automatic selection signal B.

The signal switching means 225 outputs the tracking signal by switching to the operation terminal 3A control signal when the automatic selection signal B is OFF signal and by switching to the operation terminal 3B control signal when the automatic selection signal B is ON signal.

Now, a specific example of the action of the third embodiment will be described with reference to FIG. 9.3 and FIG. 224.

For example, as shown in FIG. 223, the signal switching means 9A is manually operated, the operation terminal 3A control signal is 30%, the signal switching means 9B is manually operated, and the operation terminal 3B control signal is 60% during time t0 to time t1. In this case, both of the automatic selection signals A, B are OFF signal, the signal switching means 25 outputs the operation terminal 3A control signal, the control operation means 8 is tracked by the operation terminal 3A control signal, and the PID control signal is 30%.

Under this condition, at time t1, when the automatic selection signal A becomes ON signal, the signal switching means 9A is switched to the automatic operation. As the control operation means 8 starts the PID control from the tracked 30%, the operation terminal 3A control signal shifts to the PID control without bumping. And, it gradually approaches to the set signal.

Figure 24:
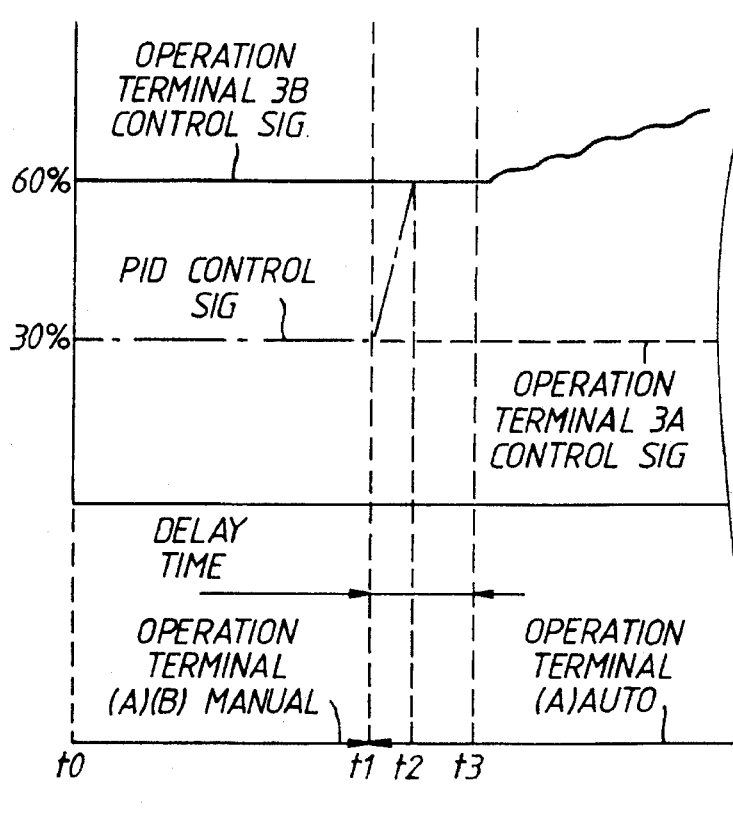
FIG. 24 is a time chart showing another embodiment of the action of FIG. 22.

On the other hand, as shown in FIG. 24, during time t0 to time t1, the signal switching means 9A is manually operated, the operation terminal 3A control signal is 30%, the signal switching means 9B is manually operated, and the operation terminal 3B control signal is 60%.

Under this condition, at time t1, when the automatic selection signal B becomes ON signal, first, the signal switching means 25 is immediately switched from the operation terminal 3A control signal (30%) to the operation terminal 3B control signal (60%). Therefore, the tracking signal from the signal switching means 25 to the control operation means 8 varies from 30% to 60%.

Then, during time t1 to time t2, as the transfer condition signal B of the time lag means 23 has the time lag, switching of the signal switching means 9B is not executed. Therefore, the output of 60% of the manual operation is retained. During which, the tracking signal of the control operation means 8 outputted from the signal switching means 25 is switched from the operation terminal 3A control signal to the operation terminal 3B control signal.

At time t2, the transfer condition signal B inputted in the tracking condition means 24 from the time lab means 23 becomes ON signal. Thus, the tracking condition signal becomes OFF signal, and tracking of the control operation means 8 is released. And, the control operation means 8 shifts to the PID control signal based on the difference signal and outputs 60%. At the same time, the transfer condition signal B of the signal switching means 9B also becomes ON signal. And, the output of the signal switching means 9B is switched to the PID control signal and shifts to the PID control from 60% without bumping.

Thus, when both of the operation terminals are manually operated, one of the operation terminal control signals is always tracked to the control operation means 8. Therefore, making one of the operation terminals to the automatic operation can be made without any problem. When switching the other operation terminal to the automatic operation, timing to switch to the automatic operating and timing to release the tracking are delayed, and during which, the tracking signal is switched to the output of the other operation terminal. Therefore, the operation terminal control signal can be switched to the automatic operation without bumping.

When the operation terminal is switched from the automatic operation to the manual operation, the function to start the manual operation with the operation terminal control signal which was outputted by the signal switching means as the initial value is given to the manual operator. Thus, at the time of switching from the automatic operation to the manual operation, outputting of the operation terminal can be executed without bumping. Such a function is provided for the first and second embodiments but, since it is the function commonly known to those skilled in the art, its detailed description will be omitted.

In the description of the above three embodiments, the signal switching means was used to cut off the PID control signal on its way, but it can be similarly executed by switching to the other control signal which is outputted by the other device not shown by an interlock or the like. However, in the first and second embodiments, in the opening fixing control that one operation terminal has the opening changed stepwisely at the moment switched to the other control signal, the operation terminal on the PID controlling side is also operated in the reverse direction stepwisely. In this case, in the total of the both operation terminals 3A, 3B, the required opening is secured but, as the control signal to the both operation terminals 3A, 3B is outputted stepwisely, disturbance of the process system is assumed to be larger than the above description.

And, in the above three embodiments, the control operation means was the PID operation means but this invention is not limited to this and it may be a PI operation means.

And, in the above three embodiments, the operation terminal was the flow control valve but this invention is not limited to this and it may be a fan, pump, compressor, motor and so on.

These three embodiments have the following effects.

According to the first embodiment and the second embodiment, in the case that one operation terminal is operated by the other control signal (e.g. the manual operation signal), the control operation signal (e.g. the PID control signal) is precedingly compensated by the other operation terminal control signal. Therefore, when the other control signal is switched to the control operation signal, disturbance to the process can be suppressed to the minimum and the control system can be stabilized soon.

According to the first embodiment and the second embodiment, when one operation terminal is operated by the value (e.g. the manual operation value) of the other control signal, the value obtained by reducing the value (e.g. the manual operation value) of the other control signal from the whole control amount is sent to the other operation terminal as the control operation signal, so that disturbance given to the process can be suppressed to be small.

According to the first embodiment and the second embodiment, the mean value of one operation terminal control signal and the other operation terminal control signal is calculated, and as this mean value signal is tracked to the control operation signal, when either of the operation terminals is switched to the automatic operation, switching is made without bumping.

According to the second embodiment, when both of the operation terminals are automatically operated, when one operation terminal is subjected to the bias setting, operation is made so that the entire control operation signal to the both operation terminals is always balanced. Even when the bias set signal is changed, as the following is made with a certain time lag, disturbance to the process system can be suppressed to the minimum, and the control system can be stabilized soon.

According to the third embodiment, when the both operation terminals are manually operated, as one operation terminal control signal is tracked to the control operation signal, one operation terminal can be switched to the automatic operation without bumping. Further, when the other operation terminal is switched to the automatic operation, timing to switch the other operation terminal to the automatic operation and timing to release the tracking are delayed and, during which, the tracking signal is switched to the output of the other operation terminal, so that the other operation terminal can be also switched to the automatic operation without bumping.

What is claimed is:

1. A modulating controller for controlling a process amount by controlling first and second operation terminals disposed in parallel comprising:

sensing means for detecting the process amount;

difference operation means for providing a difference signal representing a difference between the process amount detected by said sensing means and a process amount set signal;

control operation means for receiving the difference signal from said difference operation means and for outputting a first control operation signal;

signal generating means for generating a second control operation signal;

first signal switching means, corresponding to said first operation terminal, for receiving and switching between outputting a first adding result signal and the second control operation signal, and for outputting a first operation terminal control signal to said first operation terminal;

second signal switching means, corresponding to said second operation terminal, for receiving and switching between outputting a second adding result signal and the second control operation signal, and for outputting a second operation terminal control signal to said second operation terminal;

first difference operation means for providing as a first difference signal a difference between said first control operation signal and the second operation terminal control signal outputted by the second signal switching means;

second difference operation means for providing as a second difference signal a difference between said first control operation signal and the first operation terminal control signal outputted by the first signal switching means;

adjusting means for outputting said second difference signal unchanged and for retaining the second difference signal when either of said first and second signal switching means outputs the second control operation signal, and for outputting a signal shifting toward zero from a value of the retained signal when said one of the first and second signal switching means outputting the second control operation signal switches to output said first or second adding result signal;

first addition means for adding said first difference signal and said first control operation signal and for outputting the first adding result signal to said first signal switching means; and second addition means for adding the output of said adjusting means and said first control operation signal and for outputting the second adding result signal to said second signal switching means.

2. A modulating controller for controlling a process amount by controlling first and second operation terminals disposed in parallel comprising:

sensing means for detecting the process amount;

difference operation means for providing a difference signal representing a difference between the process amount detected by said sensing means and a process amount set signal;

control operation means for receiving the difference signal from said difference operation means and for outputting a first control operation signal;

signal generating means for generating a second control operation signal;

first signal switching means, corresponding to said first operation terminal, for receiving and switching between outputting a first adding result signal and the second control operation signal, and for outputting a first operation terminal control signal to said first operation terminal;

second signal switching means, corresponding to said second operation terminal, for receiving and switching between outputting a second adding result signal and the second control operation signal, and for outputting a second operation terminal control signal to said second operation terminal;

first difference operation means for providing as a first difference signal a difference between said first control operation signal and the second operation terminal control signal outputted by the second signal switching means;

second difference operation means for providing as a second difference signal a difference between said first control operation signal and the first operation terminal control signal outputted by the first signal switching means;

adjusting means for outputting said second difference signal unchanged and for tracking the second difference signal when either of said first and second signal switching means outputs the second control operation signal, and for outputting a signal shifting toward zero from a value of said second difference signal when said one of the first and second signal switching means outputting the second control operation signal switches to output said first or second adding result signal;

first addition means for adding said first difference signal and said first control operation signal and for outputting the first adding result to said first signal switching means; and second addition means for adding the output of said adjusting means and said first control operation signal and for outputting the second adding result to said second signal switching means.

3. A modulating controller for controlling a process amount by controlling first and second operation terminals disposed in parallel comprising:

sensing means for detecting the process amount;

difference operation means for providing a difference signal representing a difference between the process amount detected by said sensing means and a process amount set signal;

control operation means for receiving the difference signal from said difference operation means and for outputting a first control operation signal;

signal generating means for generating a second control operation signal;

first signal switching means, corresponding to said first operation terminal, for receiving and switching between outputting a first adding result signal and the second control operation signal, and for outputting a first operation terminal control signal to said first operation terminal;

second signal switching means, corresponding to said second operation terminal, for receiving and switching between outputting a second adding result signal and the second control operation signal, and for outputting a second operation terminal control signal to said second operation terminal;

first difference operation means for providing as a first difference signal a difference between said first control operation signal and the second operation terminal control signal outputted by the second signal switching means;

second difference operation means for providing as a second difference signal a difference between said first control operation signal and the first operation terminal control signal outputted by the first signal switching means;

bias setting means for setting a bias value;

adjusting means for outputting said second difference signal unchanged and for retaining the second difference signal when either of said first and second signal switching means outputs the second control operation signal, and for outputting a signal shifting toward said set bias value from the value of the retained signal when said one of the first and second signal switching means outputting the second control operation signal switches to output said first or second adding result signal;

first addition means for adding said first difference signal and said first control operation signal and for outputting the first adding result to said first signal switching means; and second addition means for adding the output of said adjusting means and said first control operation signal and for outputting the second adding result to said second signal switching means.

4. A modulating controller for controlling a process amount by controlling first and second operation terminals disposed in parallel comprising:

sensing means for detecting the process amount;

difference operation means for providing a difference signal representing a difference between the process amount detected by said sensing means and a process amount set signal;

control operation means for receiving the difference signal from said difference operation means and for outputting a first control operation signal;

signal generating means for generating a second control operation signal;

first signal switching means, corresponding to said first operation terminal, for receiving and switching between outputting a first adding result signal and the second control operation signal, and for outputting a first operation terminal control signal to said first operation terminal;

second signal switching means, corresponding to said second operation terminal, for receiving and switching between outputting a second adding result signal and the second control operation signal, and for outputting a second operation terminal control signal to said second operation terminal;

first difference operation means for providing as a first difference signal a difference between said first control operation signal and the second operation terminal control signal outputted by the second signal switching means;

second difference operation means for providing as a second difference signal a difference between said first control operation signal and the first operation terminal control signal outputted by the first signal switching means;

bias setting means for setting a bias value;

adjusting means for outputting said second difference signal unchanged and for tracking the second difference signal when either of said first and second signal switching means outputs the second control operation signal, and for outputting a signal shifting toward said set bias value from a value of said second difference signal when said one of the first and second signal switching means outputting the second control operation signal switches to output said first or second adding result signal;

first addition means for adding said first difference signal and said first control operation signal and for outputting the first adding result to said first signal switching means; and second addition means for adding the output of said adjusting means and said first control operation signal and for outputting the second adding result to said second signal switching means.

5. A modulating controller according to any one of claims 1, 2, 3 or 4, further comprising mean value operation means for calculating a mean value of the second control operation signal and for tracking this mean value to an integral element of said control operation means when both of said first and second signal switching means output the second control operation signal.

6. A modulating controller for controlling a process amount by controlling first and second operation terminals disposed in parallel comprising:

sensing means for detecting the process amount;

difference operation means for providing a difference signal representing a difference between the process amount detected by said sensing means and a process amount set signal;

control operation means for receiving the difference signal from said difference operation means and for outputting a first control operation signal;

signal generating means for generating a second control operation signal;

first signal switching means for switching between said first and second control operation signals and for outputting an operation terminal control signal to the first operation terminal and for switching from said second control operation signal to said first control operation signal by a signal for switching this operation terminal control signal to said first control operation signal;

second signal switching means for switching between said first and second control operation signals and for outputting an operation terminal control signal to the second operation terminal;

time lag means for outputting a signal to said second signal switching means a predetermined time after receiving the signal to switch the operation terminal control signal outputted by said second signal switching means to said first control operation signal;

third signal switching means for outputting a signal which is outputted by said first signal switching means and for outputting a signal which is outputted by said second signal switching means when receiving said signal not passing through said time lag means and switching the operation terminal control signal outputted by said second signal switching means to said first control operation signal; and tracking condition means for tracking the signal outputted by said third signal switching means to said control operation means when said signal to switch the operation terminal control signal outputted by said first signal switching means to said first control operation signal and said signal to switch the operation terminal control signal outputted by said second signal switching means to said first control operation signal outputted by said time lag means are not a signal to switch to said first control operation signal.

7. A modulating controller according to any one of claims 1, 2, 3, 4 or 6, wherein said signal generating means is a manual operation device, and said second control operation signal is a manual operation value.

8. A modulating controller according to any one of claims 1, 2, 3, 4 or 6, wherein said signal generating means is disposed corresponding to said first and second signal means respectively.

9. A modulating controller according to any one of claims 1, 2, 3, 4 or 6, wherein said operation terminal is a flow rate adjusting value.

10. A modulating controller according to any one of claims 1, 2, 3, 4 or 6, wherein said control operation means is a PID control means.

* * * * *